(12) United States Patent
Hong et al.

(10) Patent No.: US 11,047,974 B1
(45) Date of Patent: Jun. 29, 2021

(54) SYSTEMS AND METHODS FOR VIRTUAL DOPPLER AND/OR APERTURE ENHANCEMENT

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 0 days.

(21) Appl. No.: 17/117,960

(22) Filed: Dec. 10, 2020

Related U.S. Application Data

(60) Provisional application No. 62/947,790, filed on Dec. 13, 2019, provisional application No. 63/034,514, filed on Jun. 4, 2020.

(51) Int. Cl.
| | | |
|---|---|---|
| *G01S 13/68* | (2006.01) | |
| *G01S 7/35* | (2006.01) | |
| *G01S 13/524* | (2006.01) | |

(52) U.S. Cl.
CPC .............. *G01S 13/68* (2013.01); *G01S 7/354* (2013.01); *G01S 13/5246* (2013.01)

(58) Field of Classification Search
CPC ...................................... G01S 13/68
USPC .......................................... 342/93
See application file for complete search history.

(56) References Cited

U.S. PATENT DOCUMENTS

| | | |
|---|---|---|
| 3,691,560 A | 9/1972 | Hammack |
| 3,978,482 A | 8/1976 | Williams et al. |
| 4,042,927 A | 8/1977 | Helms |
| 4,084,158 A | 4/1978 | Slawsby |
| 4,246,585 A | 1/1981 | Mailloux |
| 4,544,927 A | 10/1985 | Kurth et al. |
| 4,546,355 A | 10/1985 | Boles |
| 4,717,916 A | 1/1988 | Adams et al. |
| 4,723,124 A | 2/1988 | Boles |
| 4,794,395 A | 12/1988 | Cindrich et al. |
| 4,996,532 A | 2/1991 | Kirimoto et al. |
| 5,218,359 A | 6/1993 | Minamisono |
| 5,225,839 A | 7/1993 | Okurowski et al. |
| 5,278,757 A | 1/1994 | Hoctor et al. |
| 5,847,673 A | 12/1998 | Debell |
| 5,945,926 A | 8/1999 | Ammar et al. |
| 7,535,409 B1 | 5/2009 | Choe et al. |
| 7,609,198 B2 | 10/2009 | Chang |
| 8,269,137 B2 | 9/2012 | Ehrmann et al. |
| 8,312,771 B2 | 11/2012 | Randall et al. |

(Continued)

OTHER PUBLICATIONS

Kellner, "Instantaneous Ego-Motion Estimation using Multiple Doppler Radars", 2014 IEEE International Conference on Robotics and Automation. (Year: 2014).*

(Continued)

*Primary Examiner* — Erin F Heard
*Assistant Examiner* — Helena H Seraydaryan
(74) *Attorney, Agent, or Firm* — Jeffrey Schox; Samuel Rosenthal

(57) ABSTRACT

A system for virtual Doppler and/or aperture enhancement, preferably including one or more transmitter arrays, receiver arrays, and/or signal processors, and optionally including one or more velocity sensing modules. A method for virtual Doppler and/or aperture enhancement, preferably including transmitting a set of probe signals, receiving a set of reflected probe signals, and/or analyzing the set of received probe signals.

22 Claims, 23 Drawing Sheets

(56) References Cited

U.S. PATENT DOCUMENTS

| | | |
|---|---|---|
| 8,482,455 B2 | 7/2013 | Kemkemian et al. |
| 9,103,671 B1 | 8/2015 | Breed et al. |
| 9,470,782 B2 | 10/2016 | Millar et al. |
| 9,541,638 B2 | 1/2017 | Jansen et al. |
| 9,869,762 B1 | 1/2018 | Alland et al. |
| 10,048,366 B1 | 8/2018 | Hong et al. |
| 10,509,119 B2 | 12/2019 | Hong et al. |
| 2002/0180636 A1 | 12/2002 | Lin et al. |
| 2004/0178951 A1 | 9/2004 | Ponsford et al. |
| 2007/0013575 A1 | 1/2007 | Lee et al. |
| 2007/0285315 A1 | 12/2007 | Davis et al. |
| 2008/0122681 A1 | 5/2008 | Shirakawa |
| 2008/0250875 A1 | 10/2008 | Khosla et al. |
| 2008/0291077 A1 | 11/2008 | Chang |
| 2009/0135046 A1 | 5/2009 | Steele et al. |
| 2009/0174590 A1 | 7/2009 | Huizing et al. |
| 2009/0201206 A1 | 8/2009 | Li et al. |
| 2009/0231181 A1 | 9/2009 | Yannone |
| 2010/0019954 A1 | 1/2010 | Mizutani et al. |
| 2010/0156701 A1 | 6/2010 | Shirakawa |
| 2010/0194629 A1 | 8/2010 | Craig et al. |
| 2010/0220001 A1 | 9/2010 | Longstaff |
| 2010/0328157 A1 | 12/2010 | Culkin et al. |
| 2011/0050500 A1 | 3/2011 | Shirakawa |
| 2011/0241928 A1 | 10/2011 | Oswald et al. |
| 2012/0001791 A1 | 1/2012 | Wintermantel |
| 2012/0112954 A1 | 5/2012 | Kurono et al. |
| 2012/0268309 A1 | 10/2012 | Samuel et al. |
| 2012/0299773 A1 | 11/2012 | Stirling-Gallacher et al. |
| 2013/0069818 A1 | 3/2013 | Shirakawa et al. |
| 2013/0120191 A1 | 5/2013 | Zhang et al. |
| 2013/0300596 A1 | 11/2013 | Shirakawa |
| 2015/0102954 A1 | 4/2015 | Hong |
| 2015/0270609 A1 | 9/2015 | Jin |
| 2016/0069994 A1 | 3/2016 | Allen et al. |
| 2017/0082730 A1 | 3/2017 | Kishigami et al. |
| 2017/0141454 A1 | 5/2017 | Welle |
| 2017/0212213 A1 | 7/2017 | Kishigami |
| 2017/0315229 A1 | 11/2017 | Pavek et al. |
| 2018/0024235 A1 | 1/2018 | Hong et al. |
| 2018/0088224 A1 | 3/2018 | Kishigami |
| 2019/0018128 A1 | 1/2019 | Shollenberger |
| 2019/0212430 A1 | 7/2019 | Akamine et al. |
| 2019/0265347 A1 | 8/2019 | Wintermantel |
| 2019/0293787 A1 | 9/2019 | Sakai et al. |
| 2019/0339374 A1 | 11/2019 | Kageme et al. |
| 2019/0386712 A1 | 12/2019 | Fang |
| 2020/0025914 A1 | 1/2020 | Li et al. |
| 2020/0081110 A1 | 3/2020 | Nam et al. |
| 2020/0191939 A1 | 6/2020 | Wu et al. |
| 2020/0191940 A1 | 6/2020 | Wu et al. |
| 2020/0200892 A1 | 6/2020 | Rajab et al. |

OTHER PUBLICATIONS

Rapp, "A Fast Probabilistic Ego-Motion Estimation Framework for Radar", 2015 European Conference on Mobile Robotics. (Year: 2015).*

Hott, Maurice , et al., "Joint Super-Resolution and Array Interpolation for MIMO Radar Virtual Arrays", Proceedings of the 15th European Radar Conference, Sep. 26-28, 2018, Madrid, Spain.

International Search Report and Written Opinion for PCT Application No. PCT/US17/46708 dated Nov. 13, 2017.

International Search Report and Written Opinion for PCT Application No. PCT/US18/15873 dated May 8, 2018.

International Search Report and Written Opinion for PCT Application No. PCT/US19/40696 dated Oct. 4, 2019.

Li , et al., "Target Tracking in Uncertain Multipath Environment using Distributed Angle-of-Arrival Observation", retrieved from online on Apr. 4, 201 (Apr. 4, 2018); retrieved from URL:http://ieeexplore.ieee.org/document/7131228.

Sun, Hongbo , et al., "Analysis and Comparison of MIMO Radar Waveforms", 2014 International Radar Conference, Oct. 13-17, 2014.

Gonzalez, Hector A., et al., "Doppler Ambiguity Resolution for Binary-Phase-Modulated MIMO FMCW Radars, 2019 International Radar Conference, Sep. 23-27, 2019."

* cited by examiner

SYSTEMS AND METHODS FOR VIRTUAL DOPPLER AND/OR APERTURE ENHANCEMENT

CROSS-REFERENCE TO RELATED APPLICATIONS

This application claims the benefit of U.S. Provisional Application Ser. No. 62/947,790, filed on 13 Dec. 2019, and of U.S. Provisional Application Ser. No. 63/034,514, filed on 4 Jun. 2020, each of which is incorporated in its entirety by this reference.

TECHNICAL FIELD

This invention relates generally to the radar field, and more specifically to new and useful systems and methods for virtual Doppler and/or aperture enhancement in the radar field.

BACKGROUND

Doppler-based analysis in typical radar systems is often limited by the chirp period. For example, in MIMO radar systems, the maximum unambiguous radial velocity discernable by Doppler-based analysis (e.g., without the possibility of aliasing) is typically inversely proportional to the time between chirps and the number of radar elements. Thus, there is a need in the radar field to create new and useful systems and methods for virtual Doppler and/or aperture enhancement.

BRIEF DESCRIPTION OF THE FIGURES

FIGS. 10A-7C are schematic representations of a third example of virtual aperture radar detection, depicting a physical aperture, a pre-interpolation virtual aperture, and a post-interpolation virtual aperture, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 2A:
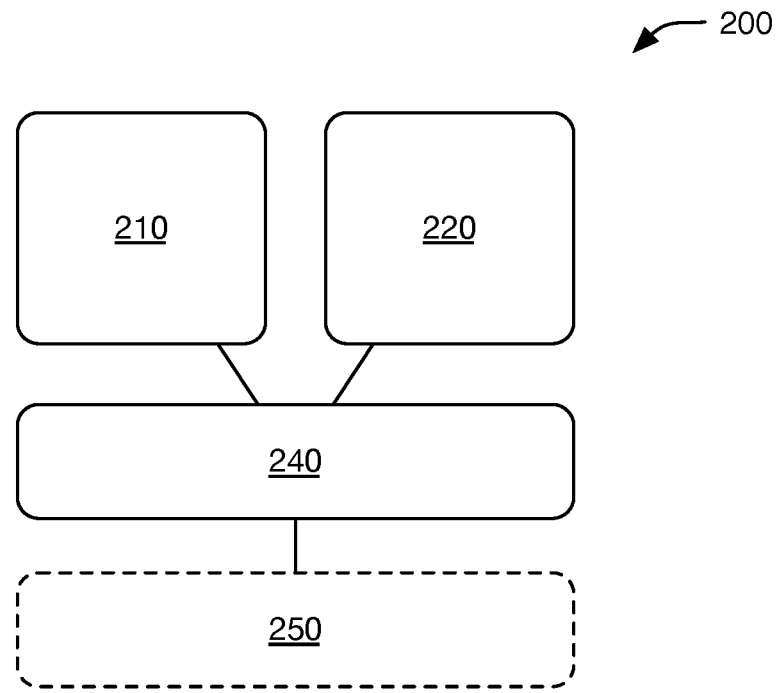
FIG. 2A is a schematic representation of an embodiment of the system.
Figure 2B:
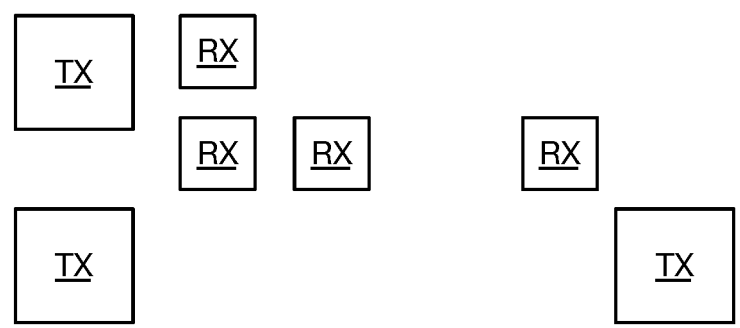
FIG. 2B is a schematic representation of an example of transmitter and receiver arrays of the system.
Figure 3A:
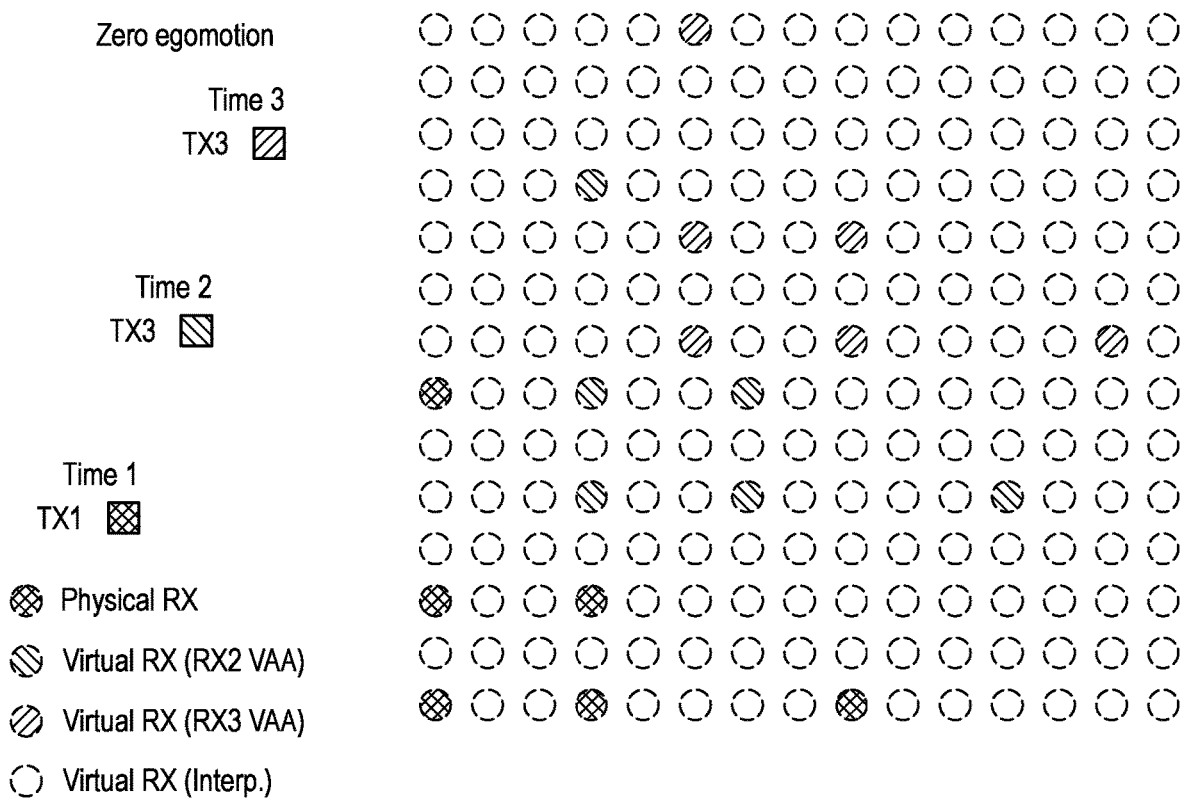
FIG. 3A is a schematic representation of an example of a virtual aperture formed by an example of the system in a stationary state.
Figure 3B:
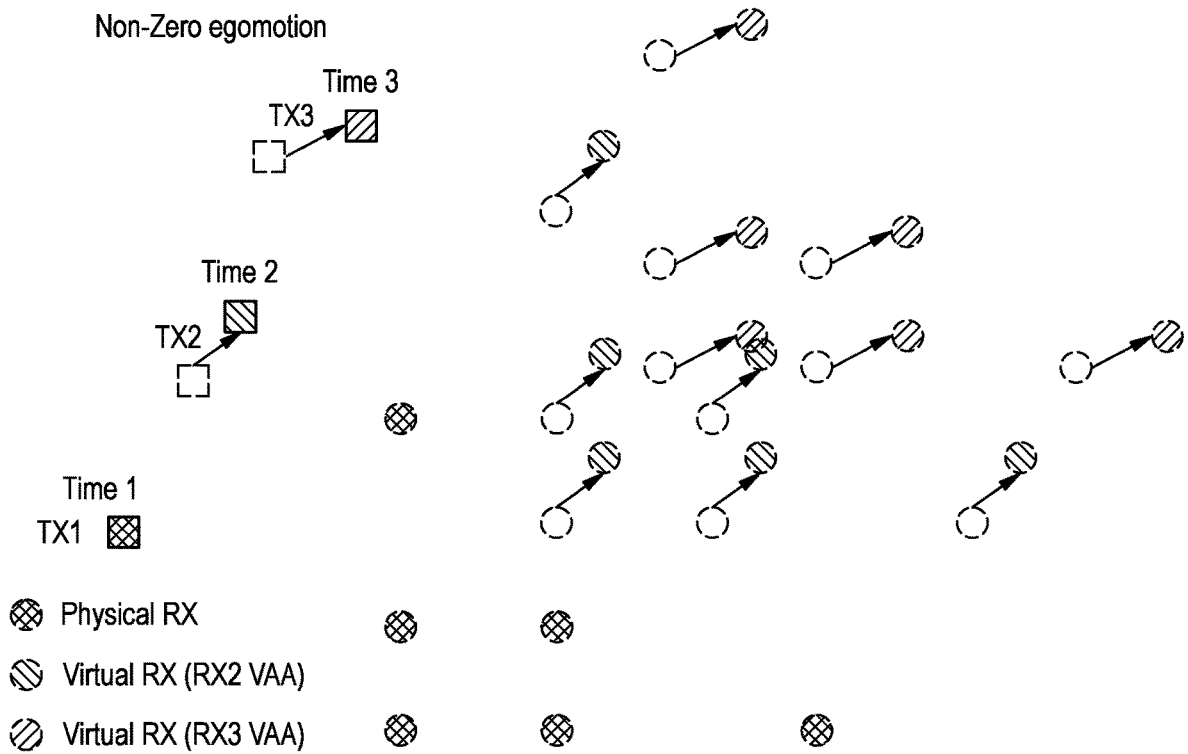
FIG. 3B is a schematic representation of an example of a virtual aperture formed by the example of the system in a non-stationary state.
Figure 3C:
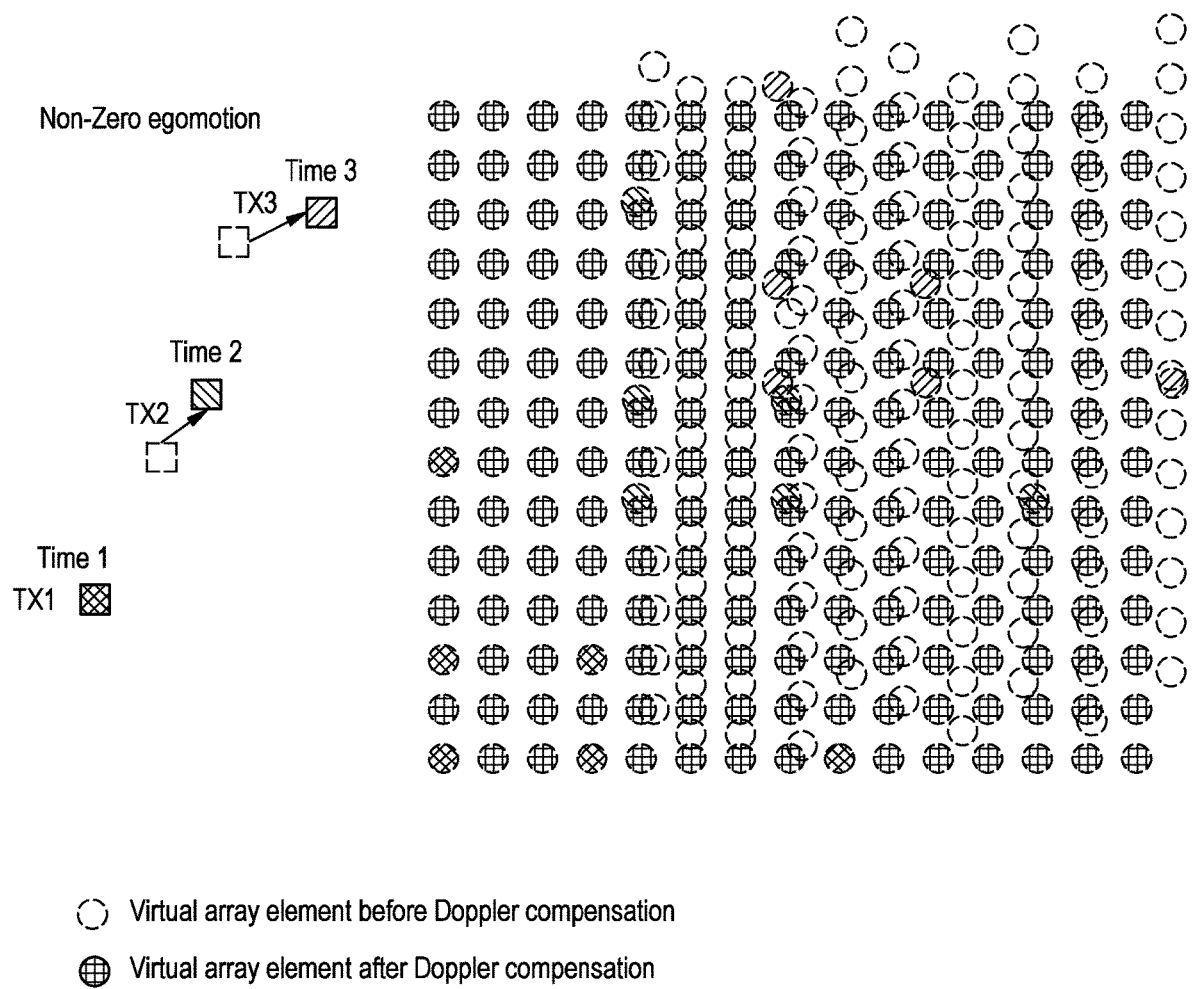
FIG. 3C is a schematic representation of an example of a virtual aperture formed by the example of the system in a non-stationary state, after compensation for system motion.

A system 200 preferably includes one or more transmitter arrays 210, receiver arrays 220, and signal processors 240 (e.g., as shown in FIGS. 2A-2B). The system 200 can additionally or alternatively include one or more velocity sensing modules 250. In some examples, the system 200 includes one or more elements such as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference (e.g., such as described regarding the system 200 of U.S. patent application Ser. No. 16/704,409 and/or of U.S. Provisional Patent Application 62/958,920).

The transmitter array 210 preferably functions to transmit a signal that, after reflection by a target, can provide information about the target (e.g., relative location, velocity, etc.). The transmitter array 210 preferably transmits a frequency shift keyed (FSK) RADAR signal or a frequency-modulated continuous wave (FMCW) RADAR signal, but the transmitter array 210 can additionally or alternatively transmit other electromagnetic signals (e.g., radio waves for RADAR; infrared, visible, and/or UV waves for LIDAR; etc.), sound signals (e.g., for SONAR), and/or any other suitable signals.

The transmitter array 210 preferably includes a plurality of transmitter elements (e.g., transmitter antennas). These elements can include: a single transmitter paired to multiple antennas, such as antennas spaced in a particular pattern and/or with antennas coupled to phase shifters and/or time delays; multiple transmitters, each paired to a single antenna; multiple transmitters, some or all paired to multiple antennas (e.g., as described above regarding the single transmitter), with the remaining transmitters preferably each paired to a single antenna; and/or any other suitable transmitter configurations. For example, a transmitter 210 may include transmitter elements spaced by a distances substantially greater (e.g., greater by more than a threshold factor, such as more than 2, 2.5, 3, 4, 5, or 10 times greater) than a distance between receiver elements (e.g., distance between closest receiver elements, average distance between neighboring receiver elements, etc.).

One or more of the transmitter elements (preferably each transmitter element of the system) can include (e.g., be associated with) one or more phase control elements. In some embodiments, the phase control elements include one or more phase inverters (e.g., configured to controllably impose a 180° phase shift on a transmitter signal). The phase control elements can additionally or alternatively include one or more phase shifters (e.g., configured to control a phase shift imposed on the transmitter signal within a phase shifter range, such as ±5°, 10°, 30°, 90°, or 180°, etc.). Although the phase shifter is preferably configured to impose phase shifts substantially independent of frequency, the phase control elements can additionally or alternatively include delay elements (e.g., delay lines) and/or any other suitable elements that impose a frequency-dependent phase shift. Additionally or alternatively, the phase control elements can include elements configured to change one or more aspects of the signal driving the transmitter, such as chirp bandwidth, start frequency (e.g., lowest or highest frequency of a chirp), idle time, and/or any other suitable aspects (e.g., aspects that will result in a phase shift).

The receiver array 220 preferably functions to receive reflections of the probe signal(s) transmitted by the transmitter 210. The receiver array 220 preferably determines phase, magnitude, and/or frequency information from reflected probe signals, but the receiver array 220 can additionally or alternatively determine any available characteristics of the reflected probe signals.

The receiver array 220 preferably includes a plurality of receiver elements (e.g., receiver antennas). The receiver array 220 includes a set of receiver elements 221 arranged in a pattern (e.g., along a horizontal or vertical axis, within a plane, etc.). The set of receiver elements 221 can include a single receiver paired to multiple antennas, such as antennas spaced in a particular pattern and/or with antennas coupled to phase shifters and/or time delays; multiple receivers, each paired to a single antenna; multiple receivers, some or all paired to multiple antennas (e.g., as described above regarding the single receiver), with the remaining receivers preferably each paired to a single antenna; and/or any other suitable receiver configurations. However, the system can alternatively include only a single receiver element 221, and/or can include any other suitable receiver elements 221 in any suitable arrangement.

Figure 7A:
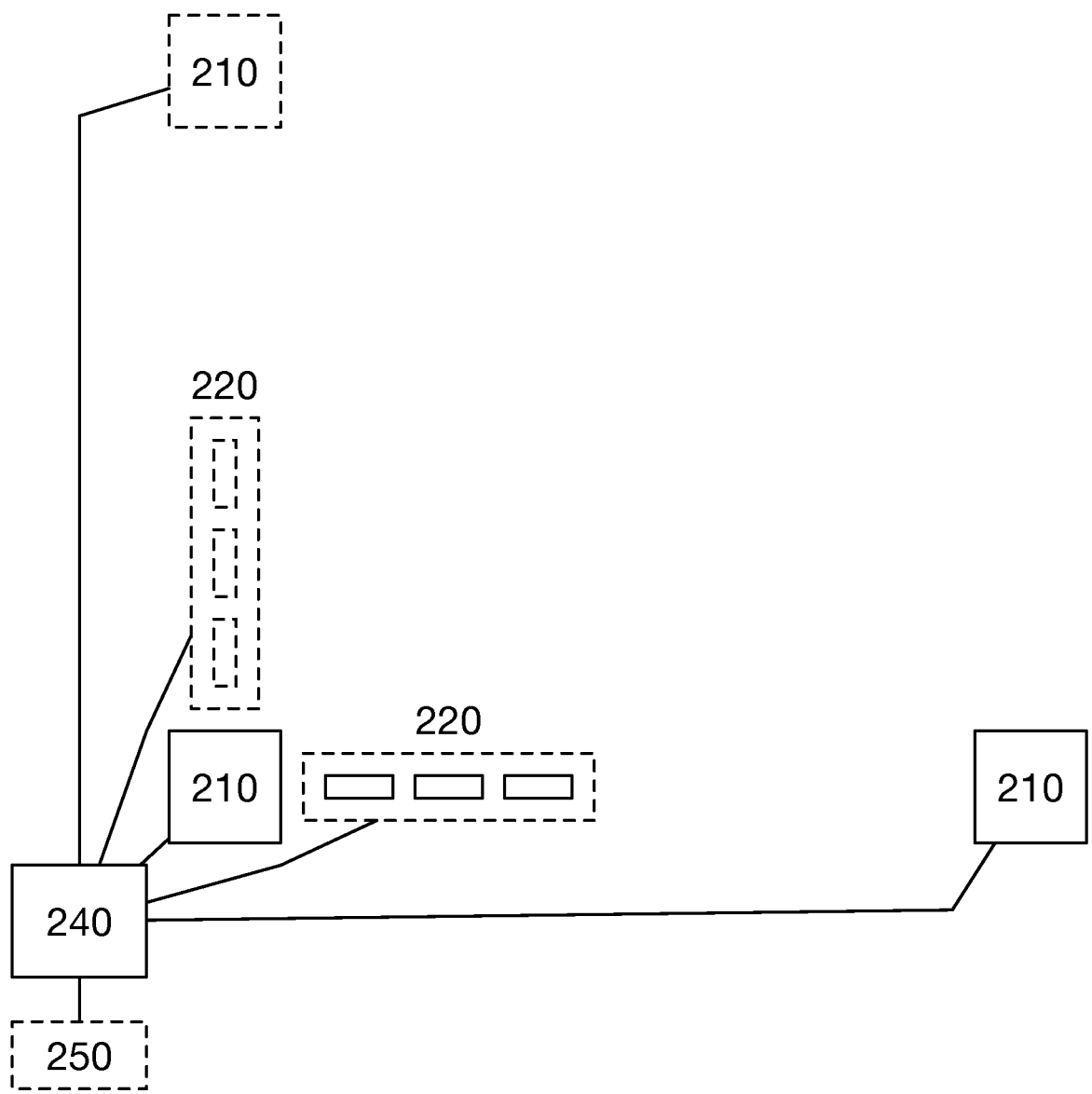
FIGS. 7A-7B are schematic representations of a first and second example, respectively, of the system.
Figure 7B:
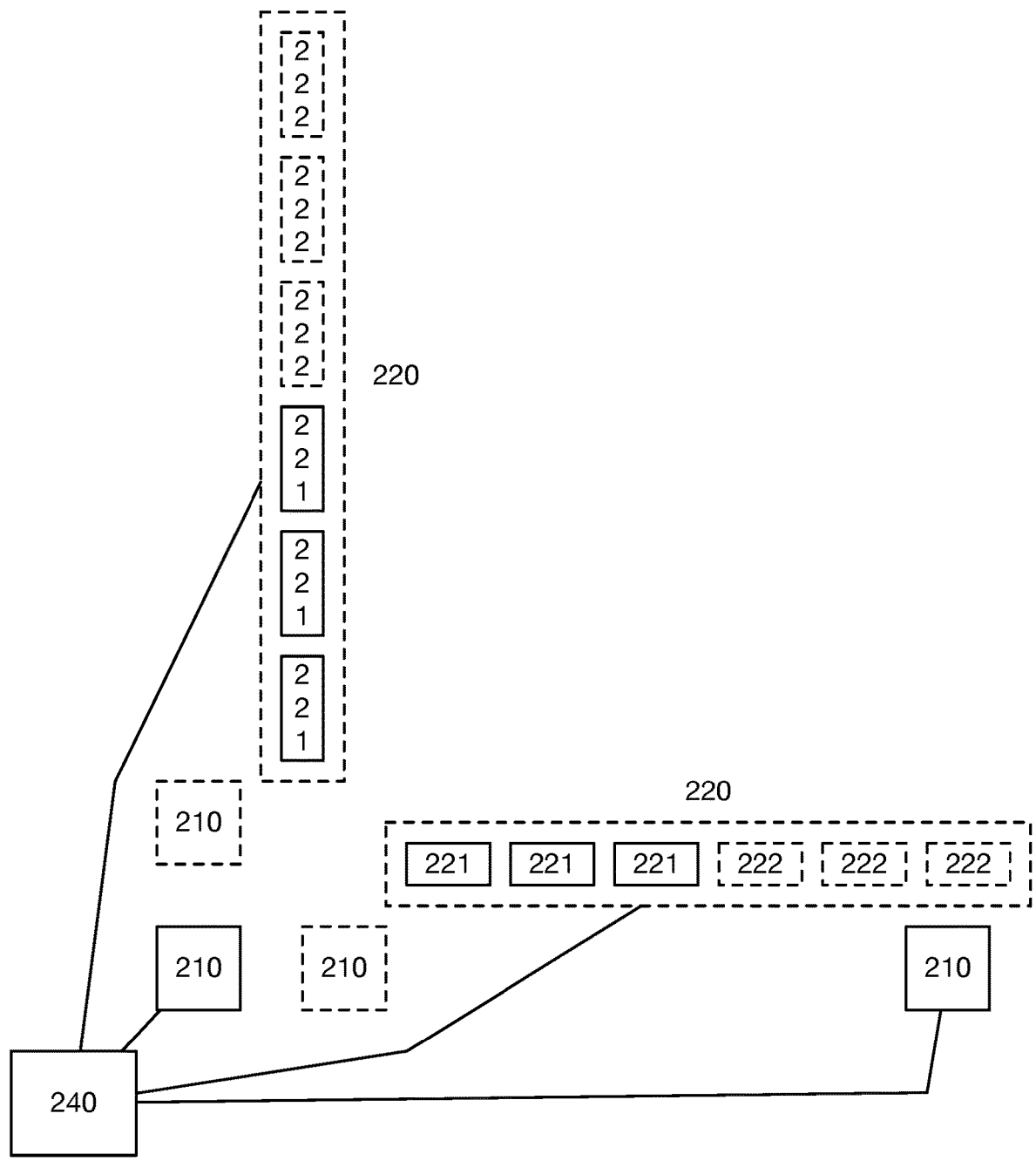
Figure 8A:
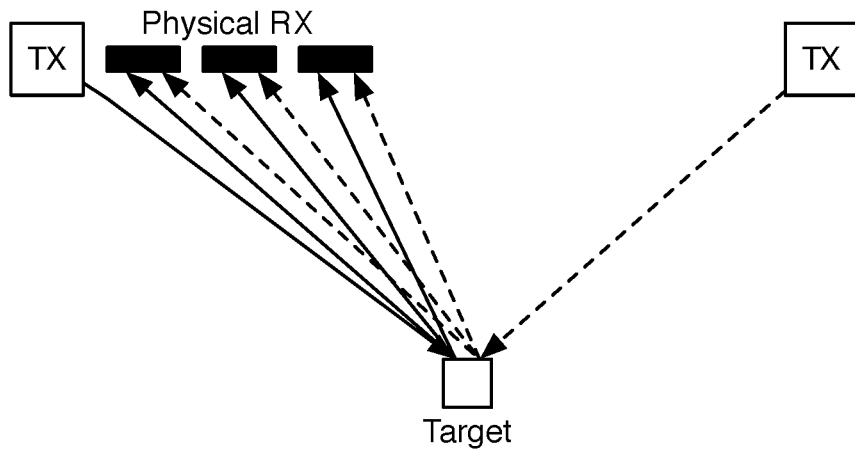
FIGS. 8A-8C are schematic representations of a first example of virtual aperture radar detection, depicting a physical aperture, a pre-interpolation virtual aperture, and a post-interpolation virtual aperture, respectively.
Figure 9A:
FIGS. 9A-9C are schematic representations of a second example of virtual aperture radar detection, depicting a physical aperture, a pre-interpolation virtual aperture, and a post-interpolation virtual aperture, respectively.
Figure 9B:
Figure 9C:
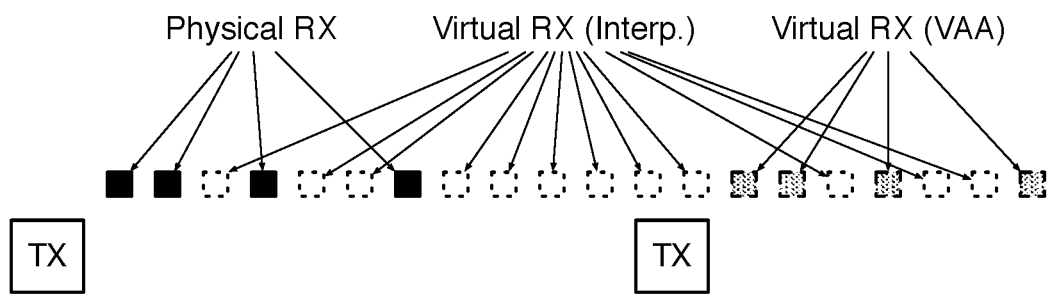
Figure 10A:
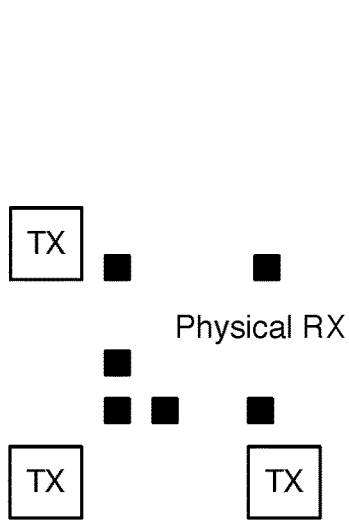
Figure 10B:
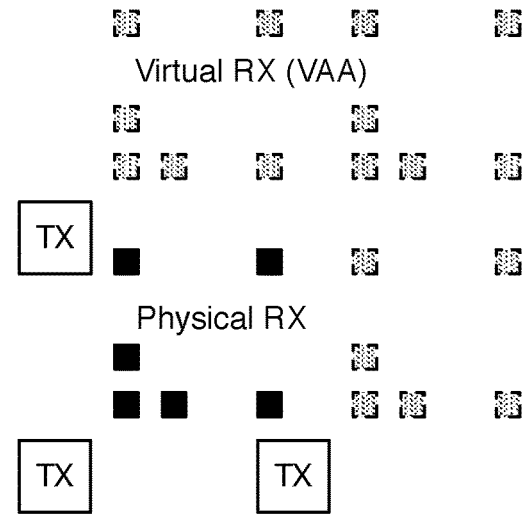
Figure 10C:
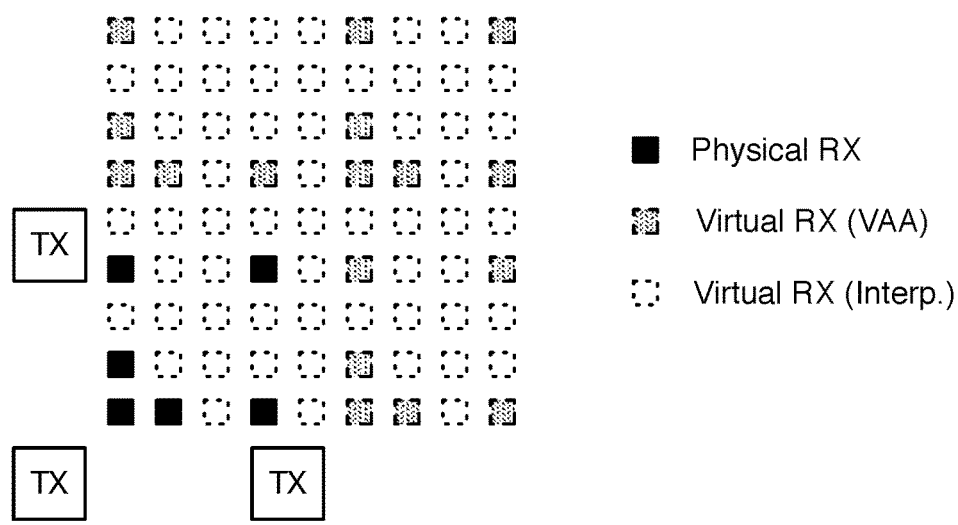
Figure 11A:
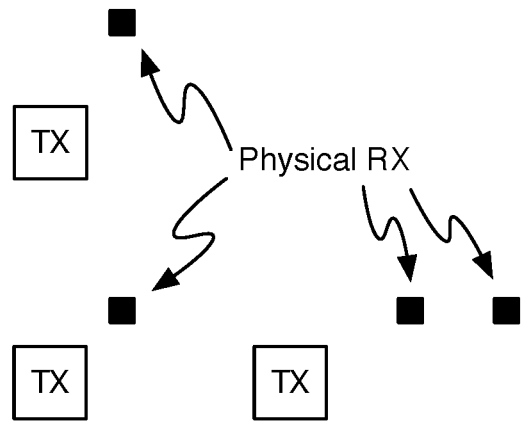
FIGS. 11A-11C are schematic representations of a fourth example of virtual aperture radar detection, depicting a physical aperture, a pre-interpolation virtual aperture, and a post-interpolation virtual aperture, respectively.
Figure 11B:
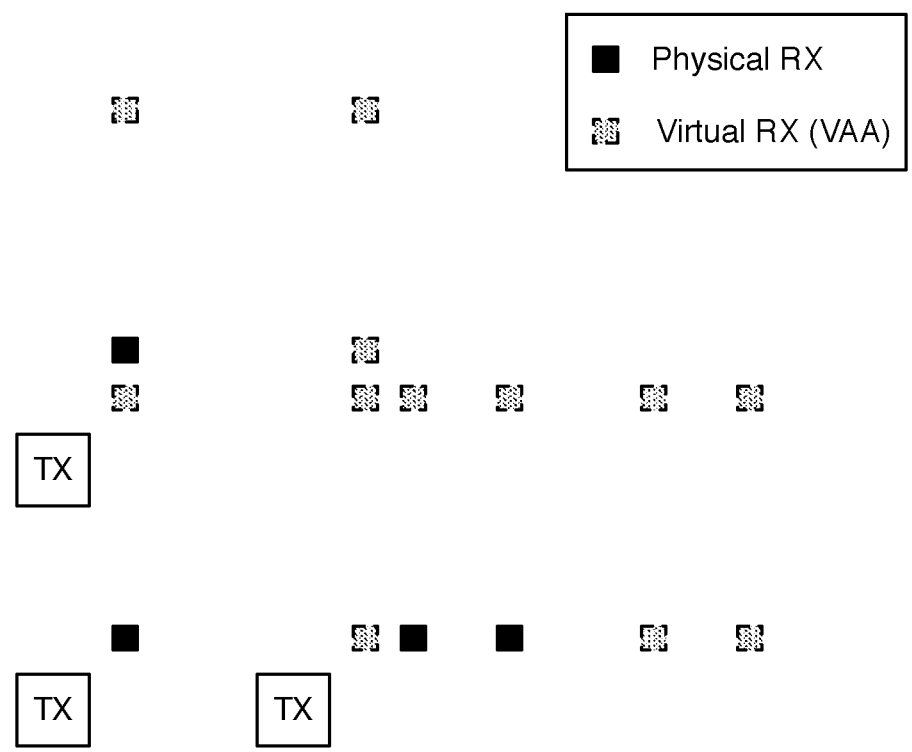
Figure 11C:
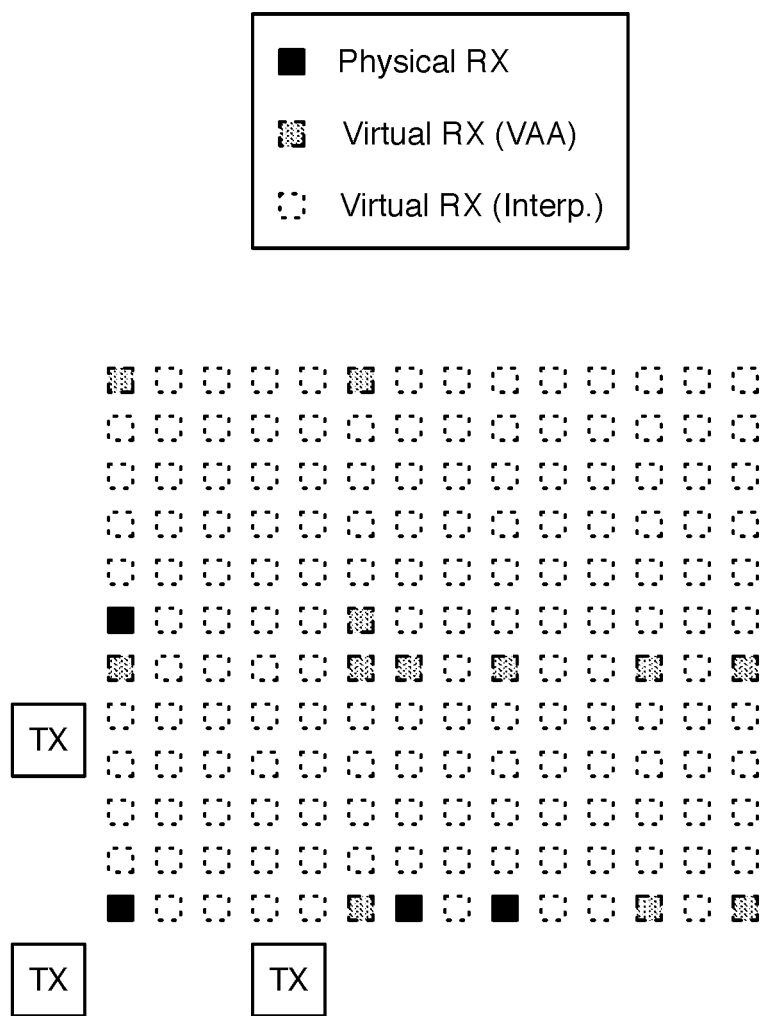
Figure 12A:
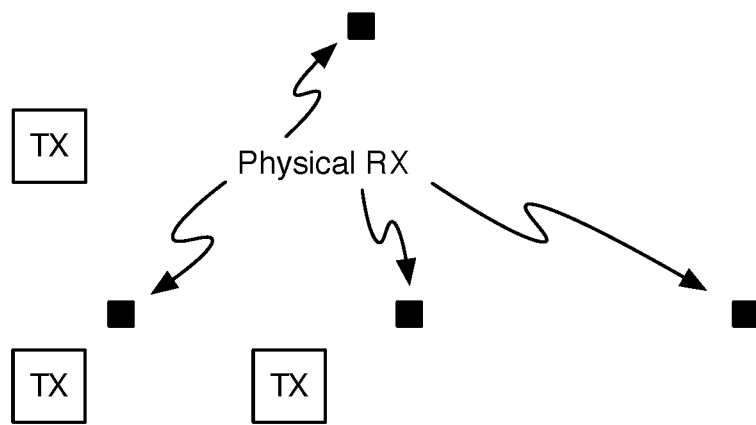
FIGS. 12A-12C are schematic representations of a fifth example of virtual aperture radar detection, depicting a physical aperture, a pre-interpolation virtual aperture, and a post-interpolation virtual aperture, respectively.
Figure 12B:
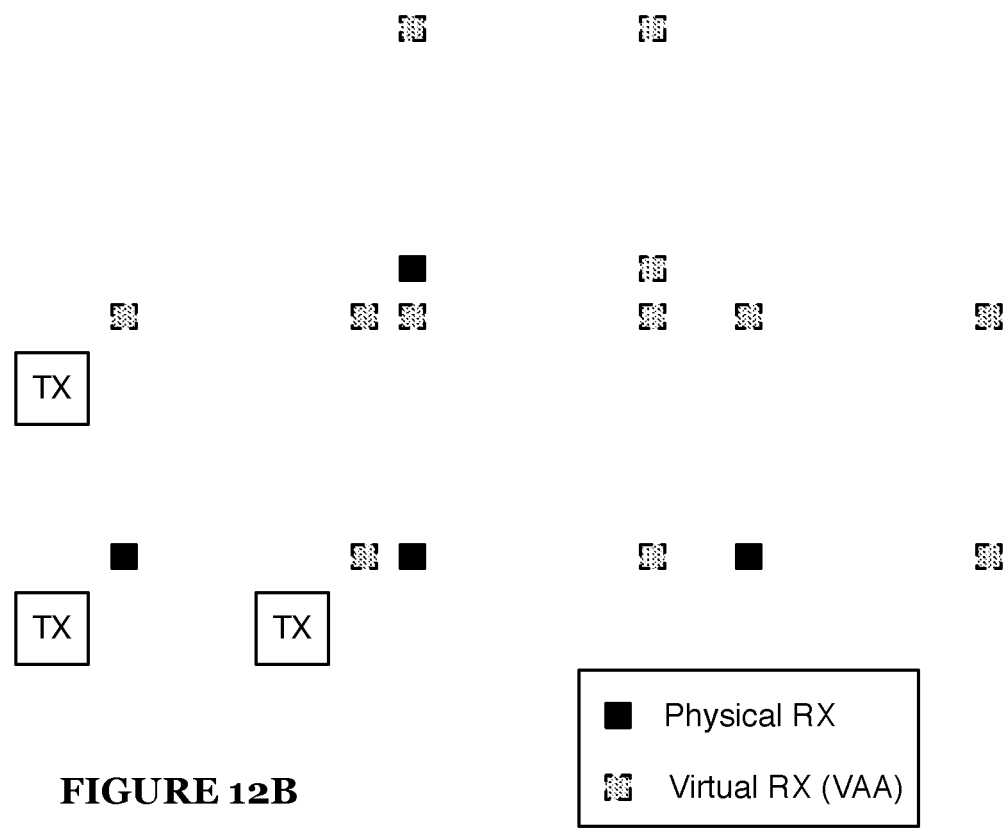
Figure 12C:
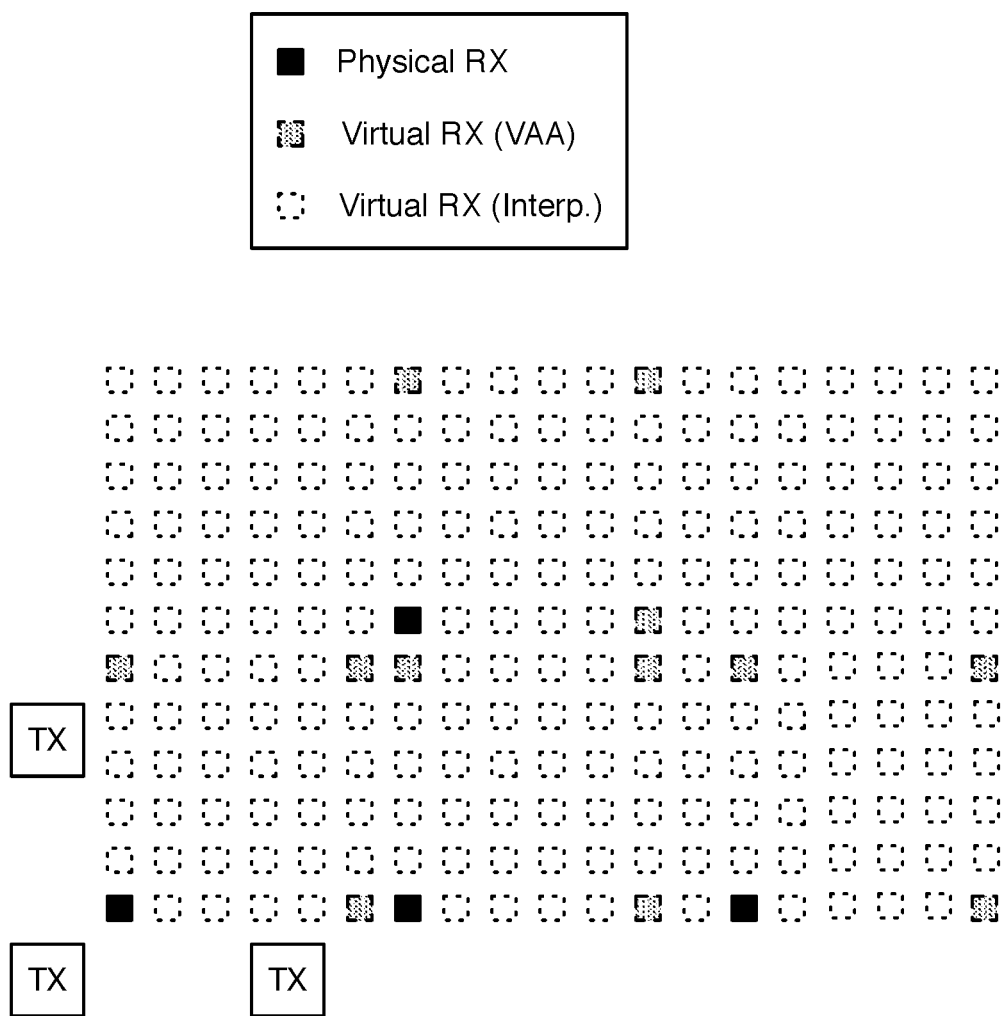
Figure 13A:
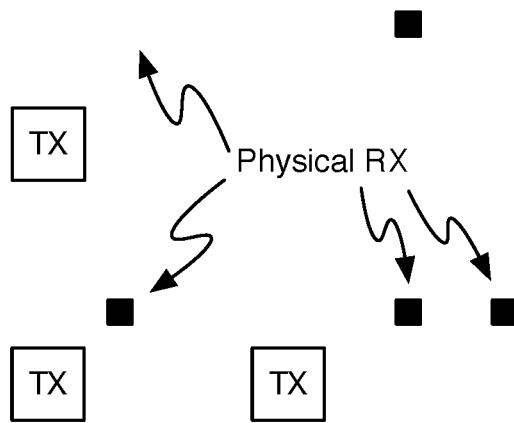
FIGS. 13A-13C are schematic representations of a sixth example of virtual aperture radar detection, depicting a physical aperture, a pre-interpolation virtual aperture, and a post-interpolation virtual aperture, respectively.
Figure 13B:
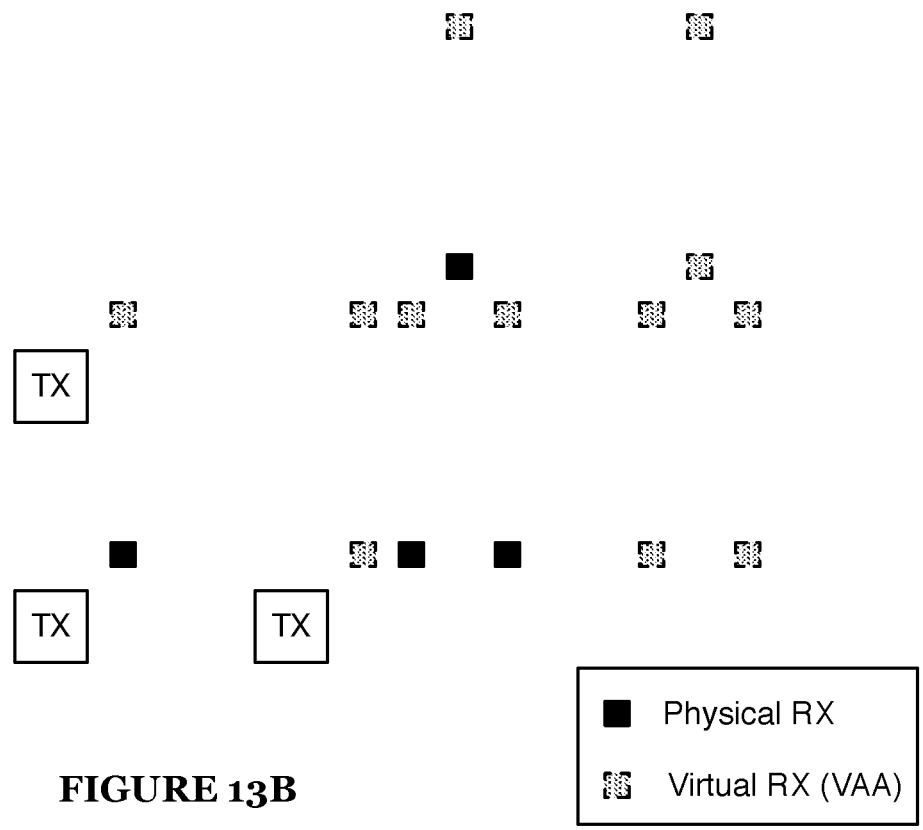
Figure 13C:
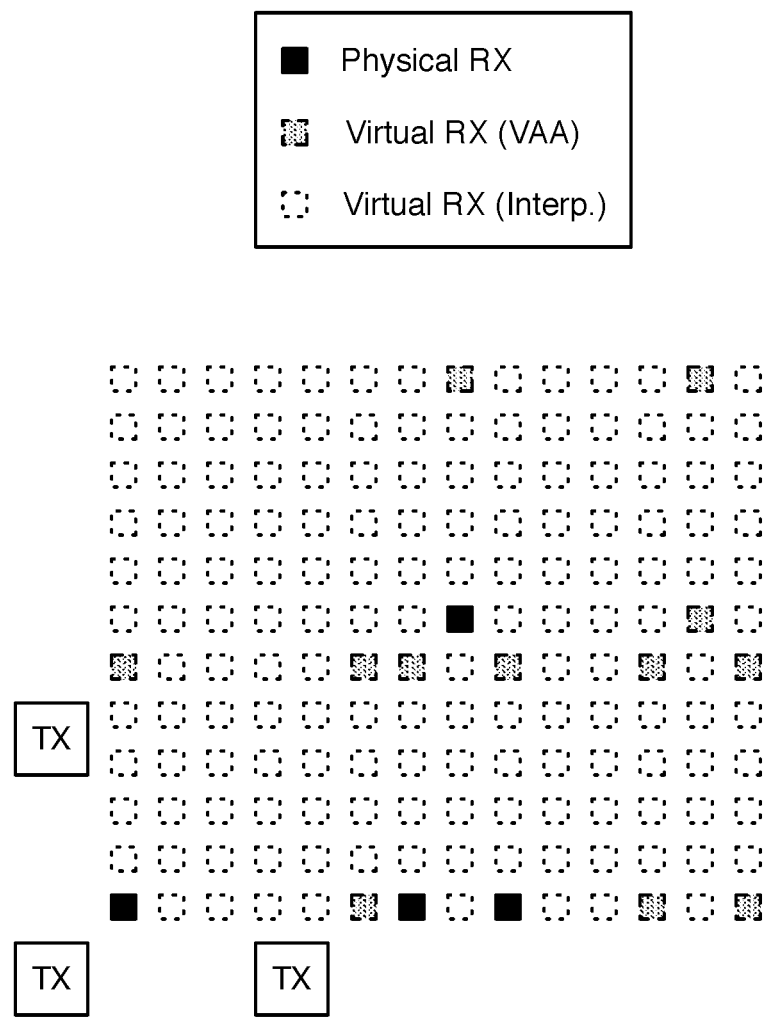

For each array (e.g., each transmitter array 210 and/or each receiver array 220), some or all element pairs (e.g., pairs of transmitter antennas for the transmitter array, pairs of receiver antennas for the receiver array) preferably have a spacing substantially equal to (and/or less than) $\lambda/2$ (wherein $\lambda$ is the radio wavelength transmitted by the transmitters). This $\lambda/2$ spacing can be a spacing between physical elements (e.g., as shown in FIGS. 8A, 9A, and/or 10A), between a physical element and a virtual (e.g., MIMO) element (e.g., as shown in FIGS. 11B, 12B, and/or 13B; wherein analysis techniques such as described below regarding S130 can be used to achieve alignment between such elements), between virtual elements, and/or between any other suitable elements. In examples in which the array is multidimensional (e.g., planar, including both horizontal and vertical elements, etc.), the array preferably includes, for each dimension of the array (e.g., for a planar array, horizontal and vertical), one or more element pairs with a $\lambda/2$ spacing along that dimension; such pairs are more preferably substantially aligned along the other dimension(s) (e.g., as shown in FIGS. 7A, 11B, and/or 12B), but can additionally or alternatively include pairs with a $\lambda/2$ spacing along multiple dimensions (e.g., as shown in FIG. 13B) and/or with any other suitable spacing along the other dimension(s). However, the arrays can additionally or alternatively include elements with any other suitable spacing. The elements of some or all of the arrays can be arranged in linear (or substantially linear) arrangements, arranged in planar (or substantially planar) arrangements, arranged substantially along a surface (e.g., cylindrical surface, spherical surface, conical surface, etc.), arranged throughout a volume, and/or have any other suitable arrangement. The transmitter and receiver arrays (and/or aspects thereof, such as primary axes, etc.) can be arranged linearly, orthogonally, parallel, at oblique angles, skew, co-planar, and/or have any suitable arrangement relative to each other. Some example arrangements are shown in FIGS. 7A, 7B, 8A, 9A, 10A, 11A, 12A, and 13A.

The arrangement of the transmitter and receiver arrays (e.g., direction and/or distance between the different transmitters and/or receivers) is preferably known. The arrangement is preferably fixed (or substantially fixed), such as wherein the transmitters and receivers of the arrays are rigidly coupled to each other. However, the arrangement can alternatively be changeable and/or changing. In some embodiments, different sets of receivers can be associated with each transmitter. The sets can be overlapping sets, disjoint sets, or have any other suitable relationship. In some such embodiments, the different sets of receivers can move independently from each other (e.g., wherein the arrangement of receivers within a set is fixed, but the arrangement of the different sets with respect to one another can vary). However, the transmitters and/or receivers can additionally or alternatively define any other suitable spatial arrangments.

The signal processor 240 preferably functions to analyze information received from other elements of the system 200, such as information determined, sampled, and/or otherwise collected by the transmitter array 210, receiver array 220, vertical receiver array 230, and/or velocity sensing module 250. The signal processor can additionally or alternatively function to control configuration and/or operation of one or more elements of the system 200. In examples, the signal processor 240 can: control transmission and/or receipt of probe signals (e.g., as described below regarding S110 and/or S120), analyze and/or store received probe signals (e.g., as described below regarding S130), calculate tracking parameters (e.g., as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference; such as described in U.S. patent application Ser. No. 16/704,409 regarding calculating initial tracking parameters S130, refining the initial tracking parameters S140, and/or modifying probe signal characteristics S150; and/or such as described in U.S. Provisional Patent Application 62/958,920 regarding transmitting a set of probe signals S110, receiving a set of reflected probe signals S120, decoding the set of received probe signals S130, evaluating effects of phase variance S140, and/or modifying probe signal characteristics S150; etc.), and/or perform any other suitable functions (e.g., any other computing and/or processing functions).

The signal processor 240 preferably includes a one or more processors (e.g., CPU, GPU, microprocessor, microcontroller, FPGA, ASIC, etc.) and/or storage units (e.g., Flash, RAM, magnetic disk drive, etc.), but can additionally or alternatively include any other suitable elements. However, the signal processor 240 can additionally or alternatively perform its functions in any other suitable manner. The signal processor 240 can additionally or alternatively be used to communicate with an external computer (e.g., to offload computations, receive additional data, and/or for any other suitable reason). However, the system 200 can additionally or alternatively include any other suitable signal processor(s) 240.

The velocity sensing module 250 preferably functions to determine (e.g., measure, estimate, receive information indicative of, etc.) the velocity ("egovelocity") of the system 200 (and/or of one or more elements of the system 200, such as the transmitter and/or receiver arrays; and/or one or more objects coupled to the system 200; etc.). In some embodiments, the velocity sensing module includes and/or receives information indicative of velocity from one or more sensors (e.g., wherein the velocity sensing module includes one or more communications interfaces that receive information from the sensor(s)). The sensors can include spatial sensors (e.g., inertial measurement sensors, accelerometer, gyroscope, altimeter, magnetometer, etc.), location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), speed sensors (e.g., pitot probes, wheel speed sensors, etc.), and/or any other suitable sensors. The communications interfaces can include Wi-Fi, Bluetooth, Ethernet, ODB-II, CAN bus, and/or any other suitable wired and/or wireless communication interfaces.

The system 200 (and/or elements thereof, such as the transmitter array 210 and/or receiver array 220) is preferably coupled (e.g., mounted, such as mounted in a fixed or substantially fixed position and orientation) to a vehicle. The vehicle is preferably a terrestrial vehicle, such as an automobile, but can additionally or alternatively be any other suitable vehicle. However, the transmitter array and receiver array can alternatively be coupled to any other suitable platform (or platforms) and/or arranged in any other suitable manner.

The system can optionally include one or more auxiliary sensors. The auxiliary sensors are preferably coupled to the transmitter array 210 and/or receiver array 220, more preferably having fixed position and orientation relative to the transmitter array 210 and/or receiver array 220, such as being mounted to the same platform (e.g., vehicle). However, the auxiliary sensors can additionally or alternatively have any other suitable arrangement with respect to the transmitter array 210 and/or receiver array 220, to each other, and/or to any other elements of the system. In examples, the auxiliary sensors can include position sensors (e.g., geopositioning system receiver), imaging sensors (e.g., camera, lidar, ultrasound, etc.), inertial sensors (e.g., IMU elements, such as accelerometers, gyroscopes, magnetometers, etc.), odometry sensors (e.g., vehicle speedometer, steering angle sensor, etc.), and/or any other suitable sensor types.

Some or all elements of the system 200 can include one or more aspects (e.g., sub-elements, configurations, functionalities, arrangements, etc.) such as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference. However, the system 200 can additionally or alternatively include any other suitable elements in any suitable arrangement.

2. Method.

Figure 1A:
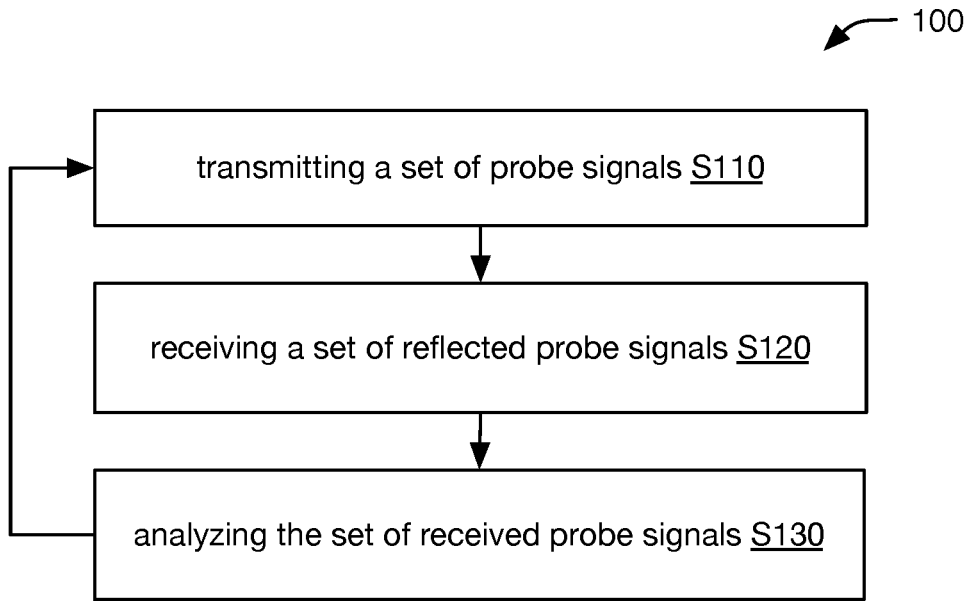
FIG. 1A is a schematic representation of an embodiment of the method.

A method 100 preferably includes: transmitting a set of probe signals S110, receiving a set of reflected probe signals S120, and/or analyzing the set of received probe signals S130 (e.g., as shown in FIG. 1A). The method preferably functions to enable radar-based detection of targets within an environment surrounding a system implementing the method. The method 100 is preferably implemented using a radar system (e.g., the system 200 described above), but can additionally or alternatively be implemented using any other suitable wave-based detection system (e.g., sonar system, lidar system, etc.).

2.1 Transmitting a Set of Probe Signals.

Transmitting a set of probe signals S110 preferably functions to transmit signals that, after reflection off of one or more targets, can provide information about those targets (e.g., relative location and/or velocity, etc.). Silo preferably includes transmitting frequency shift keyed (FSK) RADAR signals and/or frequency-modified continuous wave (FMCW) RADAR signals (e.g., defining a plurality of "chirps"). However, Silo can additionally or alternatively include transmitting any other suitable signals. In examples, the signals can include electromagnetic signals (e.g., radio waves in RADAR; infrared, visible, and/or UV light in LIDAR; etc.) and/or sound signals (e.g., as in SONAR). In some embodiments, one or more elements of Silo are performed such as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference (e.g., as described in U.S. patent application Ser. No. 16/704,409 and/or in U.S. Provisional Patent Application 62/958,920 regarding transmitting a set of probe signals S110).

In embodiments in which a plurality of chirps are transmitted, each chirp is preferably considered a separate probe signal. However, a probe signal can alternatively include multiple such chirps (e.g., 2, 4, 8, 16, 32, 2-16, 16-64, or more than 64 chirps, etc.), can include only portions of a chirp, and/or can include any other suitable transmitted signal.

The probe signals of the set are preferably generated by a single transmitter. However, the signals can alternatively be generated by multiple transmitters (e.g., defining a multi-transmitter configuration) and/or generated in any other suitable manner. Although some sets of probe signals are referred to herein as probe signals transmitted by a single transmitter, a person of skill in the art will recognize that some or all such sets can alternatively include probe signals transmitted by a particular set of transmitters defining a multi-transmitter configuration. Each signal (e.g., chirp) can have the same or a different configuration from other signals (e.g., of the set, of other sets, etc.), wherein the signal configuration can include aspects such as phase modulation, bandwidth, sampling rate, and/or any other suitable aspects of the signal.

The probe signals define a maximum radial velocity that can be unambiguously determined (e.g., without potential aliasing) based on Doppler analysis. For a typical chirp pattern and/or typical analysis techniques, this maximum radial velocity, $V_{max}$, which can also be referred to as a Doppler aliasing velocity, is inversely proportional to the time between chirps and the number of transmitters (or multi-transmitter configurations).

In a first embodiment, the chirps define a regular repeating pattern. For example, the pattern can cycle through each transmitter (or multi-transmitter configuration) in order. In a specific example, each transmitter generates one chirp, then waits for the next cycle. In alternative examples, each transmitter can generate more than one consecutive chirp (e.g., 2, 3, 4, 5-10, or more than 10 consecutive chirps, etc.), some transmitters may generate multiple consecutive chirps whereas other transmitters generate only a single chirp in the cycle, some transmitters may generate a chirp or set of consecutive chirps more frequently than other transmitters (e.g., wherein a cycle of transmissions proceeds in an order such as: TX1, TX2, TX1, TX3 or TX1, TX2, TX1, TX2, TX1, TX3).

In a second embodiment, the chirps define a non-uniform or varying sequence, or a repeating pattern with a long period, such as a period much greater than the product of the time between chirps and the number of transmitters (or multi-transmitter configurations). In this embodiment, the sequence preferably includes one or more sub-sequences of consecutive chirps from a single transmitter. For example, for each transmitter, the sequence can include one or more sub-sequences of consecutive chirps, such as 2, 3, 4, 5, or more consecutive chirps. Such sequences can enable (e.g., when coupled with analysis techniques described herein) higher $V_{max}$ than for typical chirp patterns.

The probe signals preferably include an idle time between chirps (e.g., between all consecutive chirps, whether from the same or different transmitters; between chirps from different transmitters only; between chirps from the same transmitter only; between any other suitable subset of consecutive chirps; etc.). The idle time can be in the range of 5-60% (e.g., 5, 10, 15, 20, 25, 30, 35, 40, 45, 50, 55, 60, 5-15, 10-30, 15-45, and/or 20-60%, etc.), less than 5%, or more than 60% of a characteristic chirp time (e.g., chirp duration, time between subsequent chirp onsets, etc.). In some embodiments, the idle time is a substantially constant duration (e.g., substantially equal idle time between any consecutive chirps). In other embodiments, for example, the idle time can vary, preferably varying between multiples of a minimum idle time, such as 1, 2, 3, 4, and/or 5 times the minimum idle time (and/or any other suitable multiples). In a specific example, the idle time varies between 10%, 20%, and 30% of the chirp duration. The idle time can be varied between consecutive chirps from a single transmitter, consecutive chirps of different transmitters, and/or any other suitable consecutive chirps. For example, the idle time can be varied (e.g., as different multiples of the minimum idle time) between consecutive chirps of the same transmitter, but can always be the minimum idle time between consecutive chirps from different transmitters. Such idle time variations can (e.g., when coupled with analysis techniques described herein) enable higher $V_{ax}$ than for a fixed idle time. However, the chirps and/or idle times can additionally or alternatively be controlled in any other suitable manner.

In some embodiments, the bandwidth and rate of frequency change (slope) of the chirps is substantially fixed (e.g., constant for all chirps). However, in some such embodiments, it may not be possible to achieve desired performance in terms of one or more of maximum unambiguous range (e.g., typically limited by slope), maximum unambiguous Doppler velocity (e.g., typically limited by chirp duration), and/or range resolution (e.g., typically limited by bandwidth), because the bandwidth, slope, and chirp duration are coupled; an increase in bandwidth (e.g., to increase range resolution) must be accompanied by an increase in slope and/or chirp duration (e.g., decreasing maximum unambiguous range and/or Doppler velocity). In other embodiments, one or more such characteristics can vary between the chirps. Such variations can enable increases in (e.g., via decoupling of limits on) maximum unambiguous range, maximum unambiguous Doppler velocity, and/or range resolution. In examples, one or more of these characteristics can be varied from a reference value (e.g., typical value, average value, first chirp value, minimum or maximum value, etc.) by factors between 0.1 and 10 (e.g., 0.1, 0.2, 0.3, 0.5, 0.75, 1, 1.5, 2, 3, 4, 5, 10, 0.1-0.3, 0.3-0.7, 0.7-1.3, 1.3-3, 3-6, 6-10, etc.), less than 0.1, and/or greater than 10. The characteristic(s) can be changed between each chirp, changed between sets of multiple chirps, and/or changed with any other suitable timing. The characteristic(s) can be different for all chirps (or all chirps from a particular transmitter, such as wherein the same variation pattern is used independently for each transmitter), changed in a fixed pattern, changed in a dynamically-adjusted manner, and/or changed in any other suitable manner.

In some embodiments, S110 includes imposing phase variance on some or all of the transmissions. This phase variance preferably includes imposing small phase shifts, such as phase shifts less than a threshold magnitude (e.g., 1, 2, 5, 10, 15, 30, 60, or 90 degrees, etc.). The imposed phase variance preferably changes over time (e.g., changing between each chirp, changing between sets of multiple chirps, changing during a chirp such as changing more than once for each chirp, etc.). The phase variance can be imposed uniformly on all the transmitters (or multi-transmitter configurations), can differ between transmitters (or multi-transmitter configurations), or can be imposed in any other suitable manner. The phase shifts can arise from (e.g., be imposed by) phase shifters, time delay elements (e.g., delay lines), changes to transmitted signal chirp characteristics (e.g., chirp bandwidth, start frequency, idle time, etc.), and/or can arise due to any other suitable effects.

In some embodiments, multiple transmitters (or multi-transmitter configurations) can concurrently transmit chirps, representing different probe signals (e.g., differentiated via one or more multiplexing approaches, such as code-division multiplexing, frequency-division multiplexing, Doppler-division multiplexing, etc., such as described by way of example in Sun, Hongbo, Frederic Brigui, and Marc Lesturgie, "Analysis and comparison of MIMO radar waveforms," 2014 International Radar Conference, IEEE, 2014, which is herein incorporated in its entirety by this reference). In some such embodiments, phase modulation (e.g., binary phase modulation) can be used to encode the probe signals from each transmitter (or multi-transmitter configuration), preferably such that the concurrently-transmitted probe signals are mutually orthogonal or substantially orthogonal (e.g., enabling subsequent isolation of received signals from a particular TX). Aside from the phase modulation encoding, all other chirp characteristics (e.g., duration, idle time, slope, bandwidth, phase variance, etc.) are preferably identical (or substantially identical) between concurrently-transmitted probe signals. In examples in which phase variance (e.g., as described above) is imposed on concurrently-transmitted chirps, uniform phase variance is preferably superimposed on the phase modulation of each chirp, which can function to maintain orthogonality between the chirps; for example, a 5° phase shift can be imposed uniformly on all chirps, in addition to binary phase modulation used to achieve orthogonality. However, some or all chirp characteristics can alternatively vary between the different concurrent (and/or otherwise temporally-overlapping) chirps.

Figure 4A:
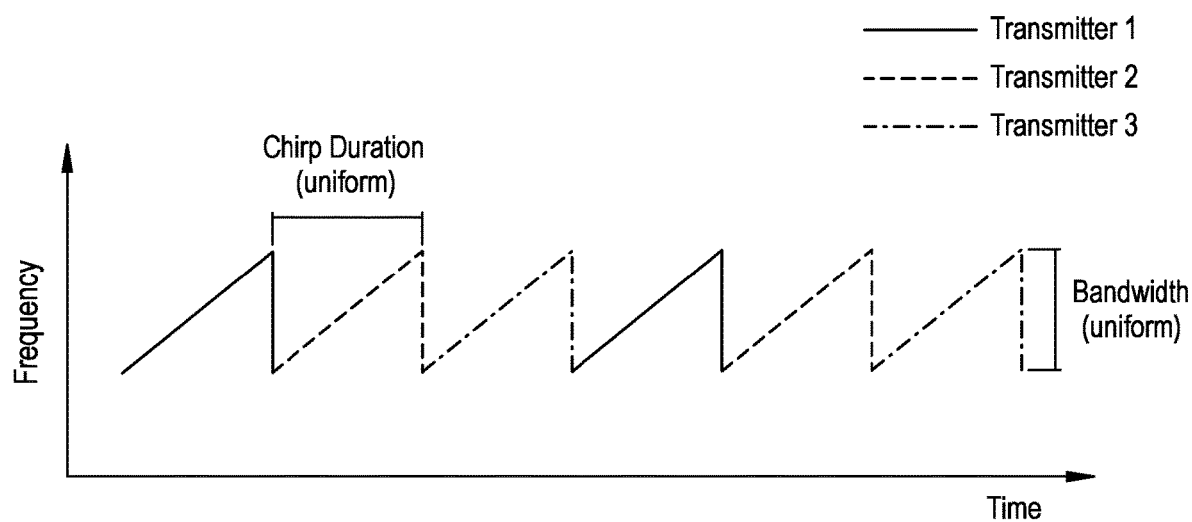
FIGS. 4A-4B are schematic representations of a first and second example, respectively, of chirp profiles.
Figure 4B:
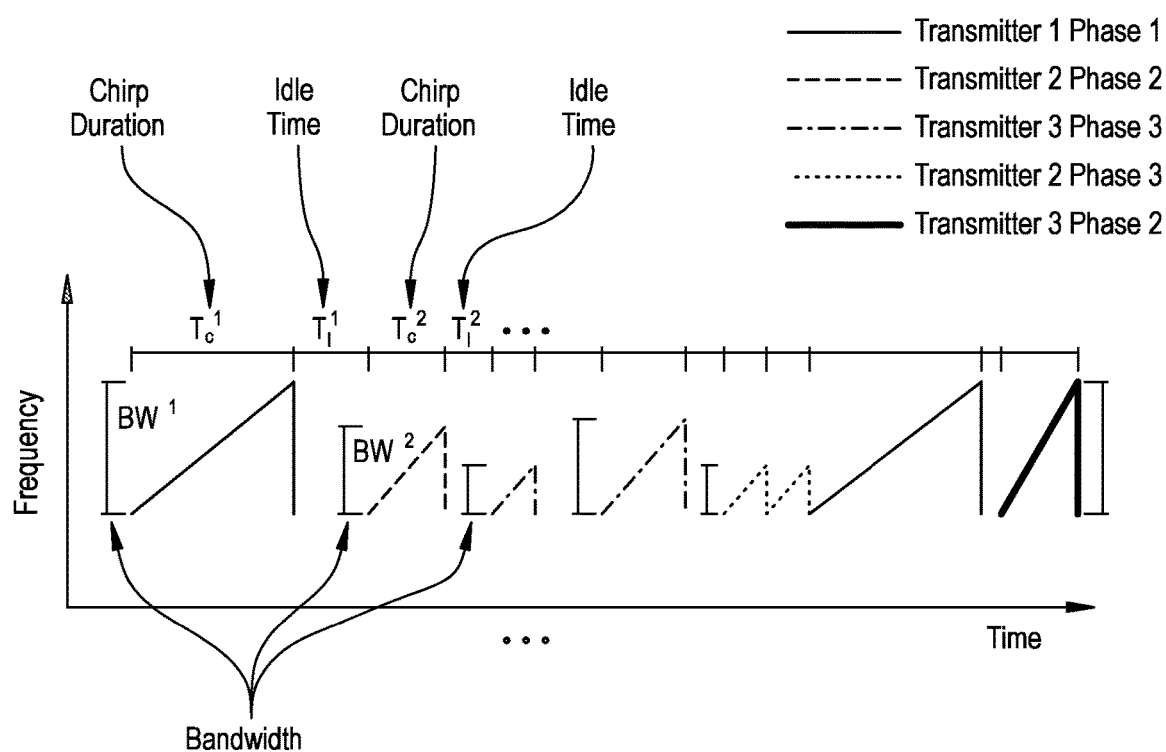

An example of chirps exhibiting substantially no idle times, and with substantially fixed bandwidths, slopes, and phase is shown in FIG. 4A. In contrast, an example of chirps exhibiting varying idle times, bandwidths, slopes, and phase shifts is shown in FIG. 4B, where different phase shifts are depicted using different line styles. A person of skill in the art will recognize that analogous chirp variations can be imposed when operating in a code-division multiplexing mode (e.g., wherein all transmitters transmit phase-encoded orthogonal chirps concurrently). However, the idle times, bandwidths, slopes, and/or phase shifts of the chirps can additionally or alternatively be controlled (e.g., varied) in any other suitable manner.

S110 can be performed continuously, periodically, sporadically, and/or with any other suitable timing. S110 is preferably repeated (e.g., continuously, such as transmitting another set of probe signals immediately or substantially immediately after finishing transmission of a first set of probe signals, etc.), but can alternatively be performed only once. These repetitions can include transmitting the same set of probe signals or different probe signals. For example, the sets can have the same or different transmission sequences, can have the same or different idle times, can have the same or different chirp configurations (e.g., phase modulation, bandwidth, sampling rate, etc.), and/or can differ or be the same in any other suitable manners. The probe signals are preferably transmitted concurrently (or substantially concurrently) with performance of other elements of the method 100 (e.g., S120 and/or S130). For example, the method 100 can include continuously transmitting sets of probe signals S110 while receiving sets of reflected probe signals S120 (e.g., probe signals emitted during the same performance of S110, a previous performance of S110, etc.), and preferably while analyzing the sets of received probe signals S130.

However, S110 can additionally or alternatively include transmitting the set (or sets) of probe signals in any other suitable manner.

2.2 Receiving a Set of Reflected Probe Signals.

Receiving a set of reflected probe signals S120 preferably functions to determine information associated with reflections (e.g., from targets in the environment) of the probe signals transmitted in S10. S120 preferably includes determining (e.g., measuring) phase, magnitude, and/or frequency information from reflected probe signals ("return signals" or "returns"), but S120 may additionally or alternatively include measuring any available characteristics of the returns. S120 preferably includes determining any data necessary to recover signal identification information (e.g., information for determining which signal, such as which signal of a signal group or of the transmitted set, the reflected probe signal corresponds to). S120 can optionally include phase shifting some or all of the received signals (e.g., using phase shift elements associated with the receivers), and/or processing the received signals in any other suitable manner.

In some embodiments, signals transmitted by different transmitters are received by different receivers (e.g., different subsets of the receivers of the system 200). For example, in embodiments in which the system 200 includes a different set of receivers associated with each transmitter, the signals transmitted by each transmitter can be received at the receivers of the associated set. However, the returns can additionally or alternatively be received by any other suitable receivers.

S120 can optionally include storing some or all of the received signals. The received signals can be stored at each receiver (e.g., storing signals received by that receiver), stored at a centralized storage element (e.g., associated with a computing element such as the signal processor 240), and/or stored in any other suitable location(s). The stored signals preferably include all returns from a set of transmitted signals (and can optionally include returns from multiple sets). However, S120 can additionally or alternatively include storing any other suitable received signals in any suitable manner.

However, S120 can additionally or alternatively include receiving the set of reflected probe signals in any other suitable manner.

2.3 Analyzing the Set of Received Probe Signals.

Analyzing the set of received probe signals S130 preferably functions to determine information (e.g., relative position and/or velocity, etc.) about the targets off of which the signals were reflected. S130 is preferably performed based on the returns received in S120, more preferably performed in response to receiving such returns (e.g., immediately or substantially immediately in response to receipt; after receiving a threshold amount or satisfactory variety of reflected signals, such as signals from all the different transmitters or a sufficient variety of transmitters; etc.), but can alternatively be performed with any other suitable timing and/or based on any other suitable information.

Figure 5A:
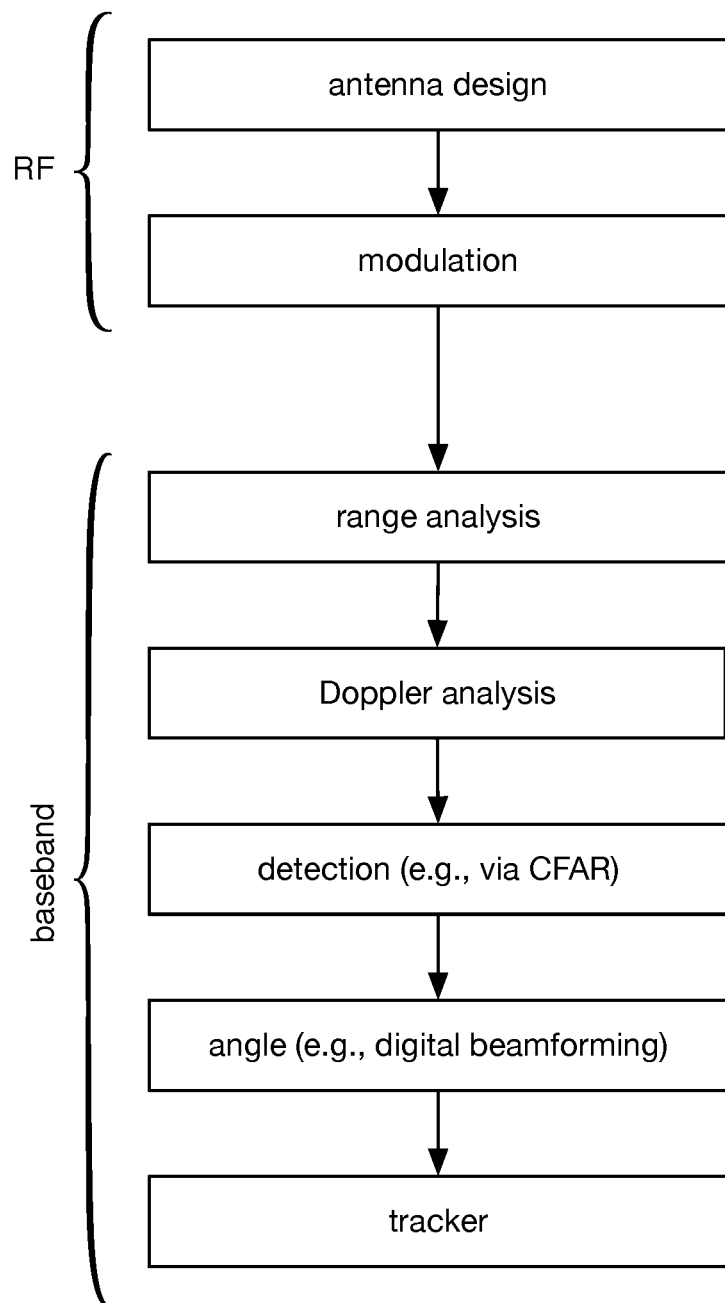
FIGS. 5A-5C are schematic representations of a first, second, and third example, respectively, of processing flows for RADAR signal analysis.
Figure 5B:
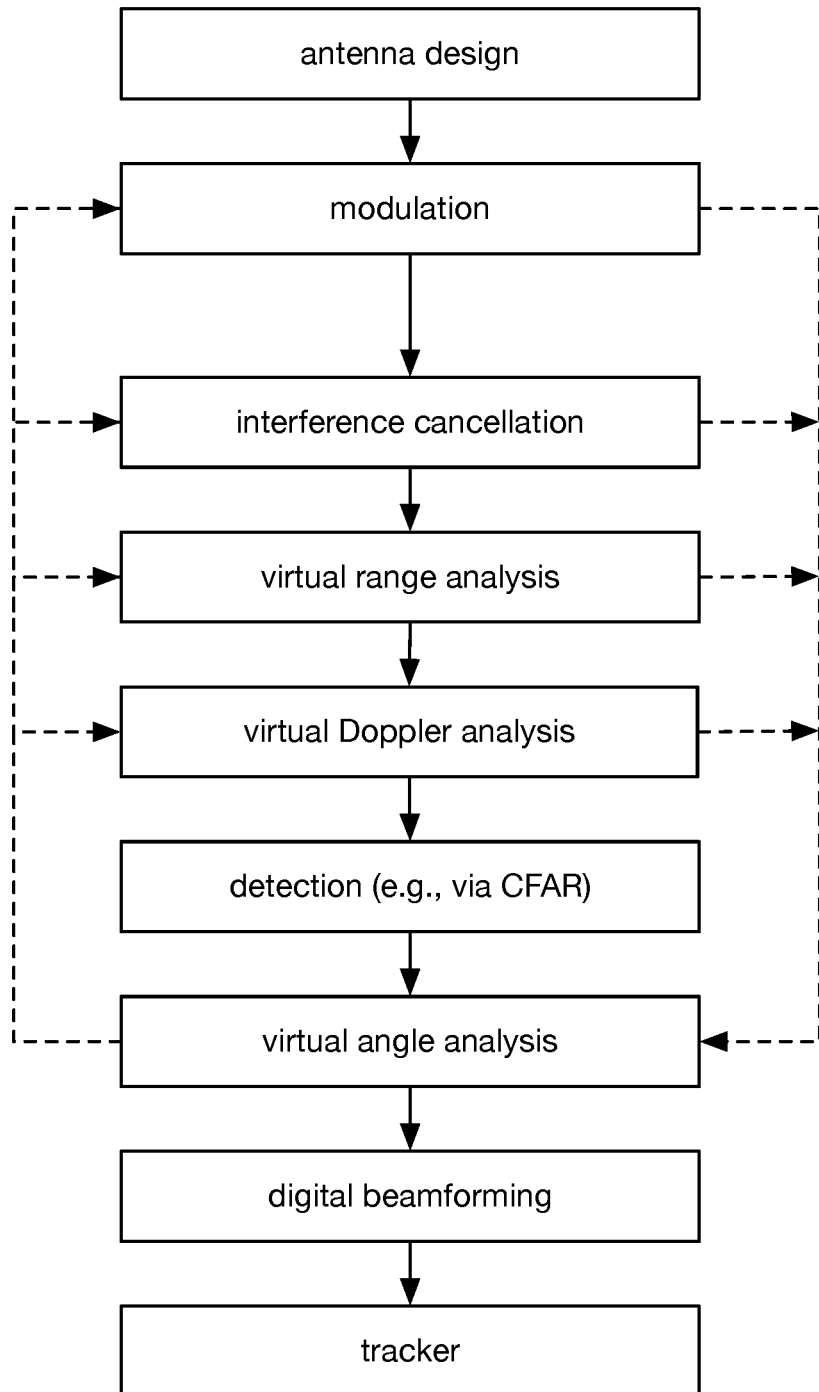

In some examples, S130 includes implementing a "single pass" processing flow (e.g., as shown in FIG. 5A), wherein the returns are first analyzed to determine a first information type (e.g., range), then a second information type (e.g., Doppler velocity) is determined based on the returns and the first information, and so on. However, S130 preferably includes implementing an adaptive processing flow (e.g., as shown by way of examples in FIGS. 5B-5D), wherein feedback and/or compensation (e.g., for errors, ambiguities, etc.) can be used to adaptively determine new modulation schemes and/or adaptively applied to previously-performed analyses (e.g., using angle information to refine range and Doppler-based analyses), such as described below in more detail.

Figure 1B:
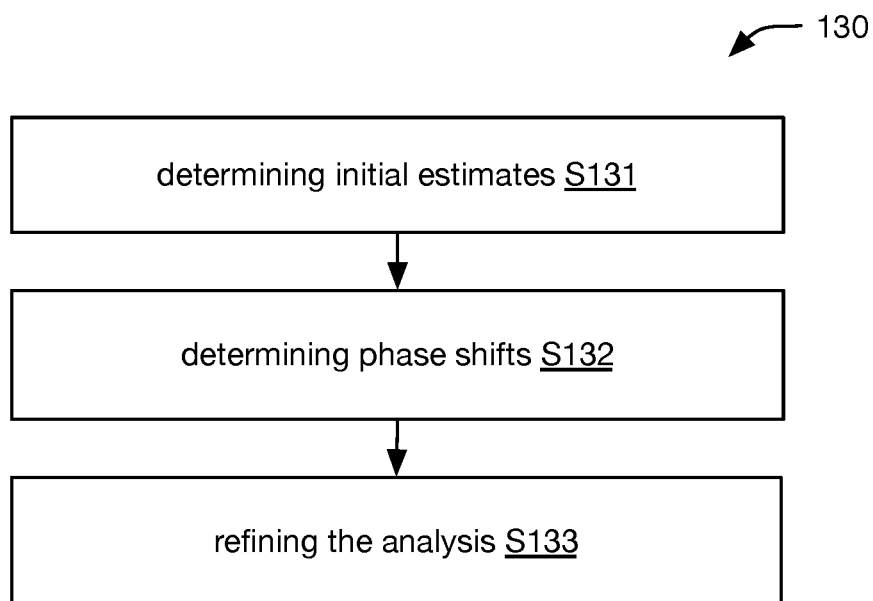
FIG. 1B is a schematic representation of an embodiment of an element of the method.
Figure 8B:
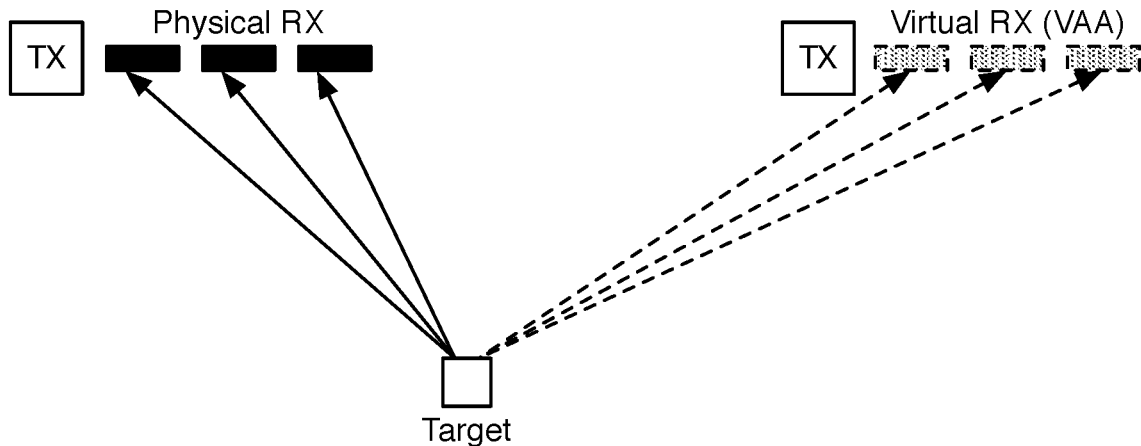
Figure 8C:
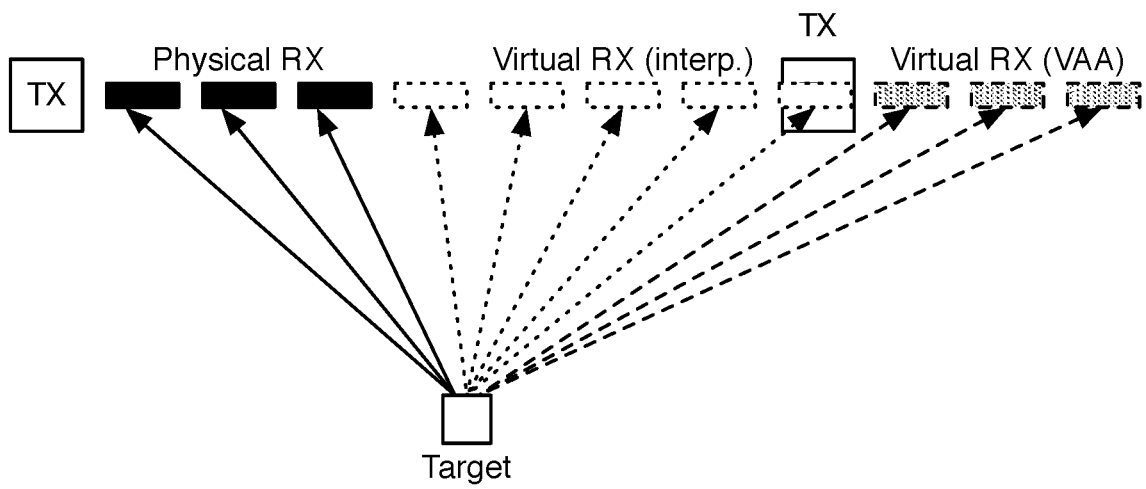

In some embodiments, such as some embodiments in which the system is stationary (e.g., in which the system is known to be stationary), the received probe signals can be used to define a virtual receiver array (e.g., including virtual MIMO receivers and interpolated virtual receivers, such as shown in FIGS. 8C, 9C, 10C, 8A, 11C, 12C, and/or 13C; including virtual MIMO receivers but not interpolated virtual receivers, such as shown in FIGS. 8B, 9B, 10B, 11B, 12B, and/or 13B; etc.). However, in other embodiments (e.g., in which compensation for system egomotion is required, in which system egomotion is unknown, etc.), it may not be possible to define a regular array of virtual receivers (e.g., as shown in FIG. 8B). In such embodiments, S130 preferably includes determining initial estimates S131, determining phase shifts S132, and/or refining the analysis S133 (e.g., as shown in FIG. 1B). However, S130 can additionally or alternatively include analyzing the set of received probe signals in any other suitable manner.

2.3.1 Determining Initial Estimates.

Determining initial estimates S131 preferably functions to determine information for use in subsequent analysis of the returns (e.g., as described below regarding S132 and/or S133). S131 is preferably performed based on one or more reflected signals originating from a single transmitter (or originating from multiple transmitters defining a multi-transmitter configuration). S131 can be performed for a single chirp, for multiple chirps emitted by the transmitter (e.g., all chirps originating from the transmitter in a single frame; 8, 16, 32, 64, 128, 256, 512, 1028, 2-10, 10-20, 20-50, 50-100, 100-200, 200-500, 500-1000, or 1000-5000 chirps, etc.) and/or for any other suitable set of signals. In some embodiments, if information associated with movement of the system ("egomotion") is not known (e.g., in system embodiments that do not include a velocity sensing module), then the phase offset between chirps from different transmitters may not be known (as the phase offset is typically determined based on spatial relationships, egomotion information, and timing information). Accordingly, it may be preferable to perform S131 based on signals from only a single transmitter (or a single multi-transmitter configuration) or based on only a single chirp. However, S131 can additionally or alternatively be performed based on any other suitable signals.

S131 can optionally include correcting the reflected signals for phase variance. For example, in embodiments in which phase variance is introduced into the transmitted signals (e.g., via phase control elements, such as described above), S131 can include correcting the reflected signals based on that introduced phase variance. However, S131 can additionally or alternatively include correcting and/or otherwise processing the reflected signals in any other suitable manner.

S131 preferably includes estimating information associated with the targets from which the signals were reflected (preferably each target from which a reflected signal associated with the transmitter or chirp under analysis was received). Such information can include radial velocity information, position information such as range and/or angle, and/or any other suitable information. In some examples, radial velocity and angle are estimated jointly (e.g., wherein radial velocity and/or angle cannot be directly calculated without knowledge of the other, such as due to coupling of spatial and temporal information in the reflected signal). Radial velocity is preferably determined based on Doppler analysis. The determined radial velocity may be an aliased value (e.g., if the true radial velocity exceeds $V_{max}$) and/or may otherwise differ from the correct value; accordingly, it may be referred to as a presumptive radial velocity or estimated radial velocity. The range is preferably determined using typical range analysis techniques, but may additionally or alternatively be determined in any other suitable manner. Determining the angle (e.g., heading from the system to the target) can optionally include determining information associated with one or more virtual transmitters and/or receivers (e.g., as described in U.S. patent application Ser. No. 16/704,409, filed 5 Dec. 2019 and titled "Systems and Methods for Interpolated Virtual Aperture RADAR Tracking", and/or in U.S. Provisional Application 62/958,920, filed 9 Jan. 2020 and titled "Systems and Methods for Phase-Modulated Radar Detection", each of which is herein incorporated in its entirety by this reference), which can function to increase angular resolution (e.g., increase precision of target angle determinations). The angle information determined in this manner may be inaccurate (e.g., due to potential aliasing of the radial velocity, which can affect phase analysis needed for angle determination); accordingly, it may be referred to as presumptive angle information or estimated angle information, and a looking angle to the target determined based on this information may be referred to as a presumptive angle or estimated angle. However, S131 can additionally or alternatively include estimating any other suitable information in any suitable manner.

S130 can include repeating S131 (e.g., to determine initial estimates based on all signals received in S120). S131 can be repeated for each transmitter (and/or multi-transmitter configuration), for each chirp and/or other probe signal, and/or repeated any suitable number of times for any suitable sets of reflected probe signals. The radial velocity information, angle information, and/or other information (associated with different signals reflected from a single target) may differ between different repetitions of S131, such as wherein angle (and/or other information) determined for each target may differ between signals transmitted by the different transmitters. Such differences typically arise from the phase shifts between different chirps (e.g., arising from egomotion). However, the initial estimates may additionally or alternatively exhibit any other suitable aspects.

2.3.2 Determining Phase Shifts.

Determining phase shifts S132 preferably functions to determine phase compensation necessary to account for system egomotion. S132 is preferably performed based on the initial estimates determined in multiple performances of S131, more preferably based on estimates associated with signals from two or more different transmitters (or multi-transmitter configurations). For example, S132 can be performed based on estimates associated with at least one chirp from each transmitter (or multi-transmitter configuration) of the system.

Figure 6A:
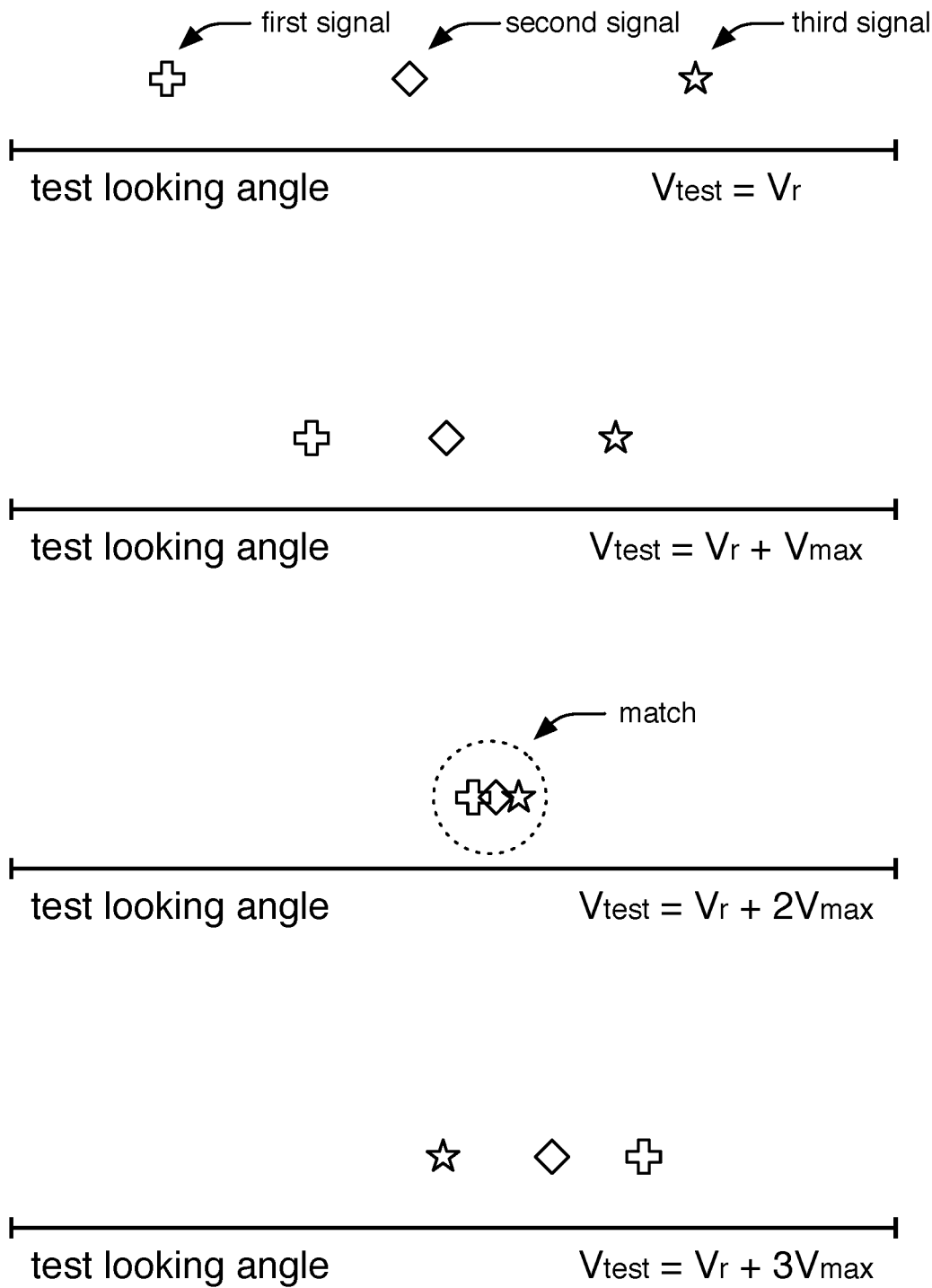
FIGS. 6A-6B are schematic representations of a first and second example, respectively, of testing candidate egovelocities.
Figure 6B:
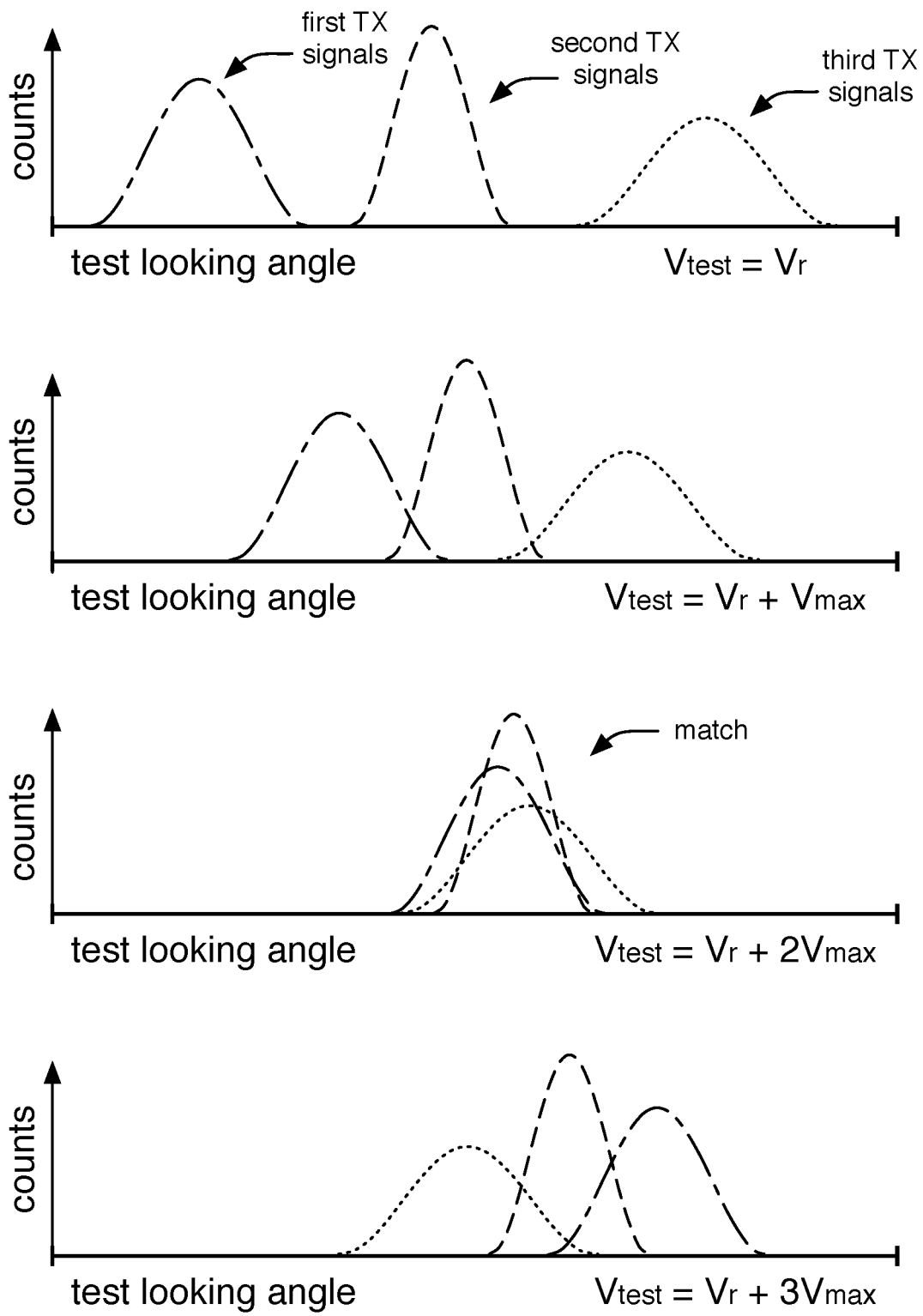

For one or more targets, S132 preferably includes testing a set of candidate egovelocities. For each target, the possible radial velocities (e.g., after accounting for potential Doppler aliasing) are in the set defined by $V_r + n \cdot V_{max}$ for integer values of n, where $V_r$ represents the radial velocity estimate determined in S131; in some examples, $V_r$ is equal (or substantially equal) for all signals reflected from a given target (e.g., for signals received during a particular time window or for a particular number of signals transmitted, such as: for a single set of reflected signals; for a single frame; 8, 16, 32, 64, 128, 256, 512, 1028, 2-10, 10-20, 20-50, 50-100, 100-200, 200-500, 500-1000, or 1000-5000 chirps, preferably consecutive chirps, etc.), whereas in other examples, $V_r$ may differ between signals transmitted by different transmitters (or multi-transmitter configurations). Each of these possible radial velocities corresponds to a candidate egovelocity of the system (assuming the target is substantially stationary). For each candidate egovelocity, the corresponding candidate phase shift values (e.g., phase shifts to be compensated for) between different chirps can be determined (e.g., assuming egovelocity is substantially constant over the time interval in which the chirps were transmitted and received) based on the candidate egovelocity, the time between chirps, and the transmitter arrangement. The candidate egovelocity can be tested by compensating the returns for the associated candidate phase shift values and using these compensated returns to determine target angles. For one of the candidate egovelocities, the angles of a target will match (e.g., within a threshold amount) across returns from different transmitters (e.g., as shown in FIGS. 6A-6B). In a first example, such as shown in FIG. 6A, a single reflected signal from each transmitter is used, wherein a match between the signals is found when all are within a threshold distance of each other. In a second example, such as shown in FIG. 6B, multiple reflected signals from each transmitter are used, each set of signals defining a transmitter-specific distribution, wherein a match between the signals is found when each transmitter-specific distribution is within a threshold distance (e.g., based on distribution mean, deviation, etc.) of the others. The candidate egovelocity at which this match is achieved represents the true egovelocity, and thus enables determination of the correct phase shifts to compensate for (e.g., along with information associated with probe signal transmission and/or reception, such as spacing and/or arrangement between radar transmit and/or receive elements, time between signal transmissions, etc.). In contrast, for the other candidates, most targets will not exhibit such matching of determined angles across returns from the different transmitters, indicating that the candidate is not likely to be the true egovelocity. A person of skill in the art will recognize that this can be applied for signals from multi-transmitter configurations in a manner analogous to that described above regarding signals from individual transmitters. However, the candidate egovelocities can additionally or alternatively be tested in any other suitable manner.

S132 can optionally include selecting a set of stationary targets. The set preferably includes most or all stationary targets from which signals are received in S120, but can alternatively include any suitable subset of stationary targets (and can optionally include non-stationary targets, such as slowly moving targets, etc.). The candidate egovelocity testing is preferably performed using the set of stationary targets (e.g., wherein candidate phase shift compensation is performed for each target of the set). The targets can be stationary with respect to each other (e.g., and with respect to other reference elements, such as the Earth and/or other reference bodies), and are not necessarily stationary with respect to the system (e.g., wherein the system egomotion describes motion of the system relative to the stationary targets).

In a first embodiment, the set of stationary targets is determined based on the initial estimates determined in S131. For example, selecting the set of stationary targets can include selecting one or more groups of targets, wherein the targets of a group all have similar angle and radial velocity estimates. The selected set of stationary targets preferably includes each target of this group or groups.

In a second embodiment, the set of stationary targets can be selected based on test compensation performed during S132. For example, many targets (e.g., the stationary targets) will produce mutually consistent results for one candidate egovelocity (the true egovelocity), whereas other targets (non-stationary targets) may not produce mutually consistent results (e.g., mutually consistent results produced only by coincidence). In this embodiment, the set of stationary targets can be selected as the group producing mutually consistent results.

Note that, to compare results from targets located at different (e.g., substantially different) looking angles to the system, a conversion from radial velocity to presumptive total speed (e.g., presuming that the target is stationary with respect to the environment) may be required (e.g., wherein $s^* = V_r / \cos \alpha$, for a presumptive total speed $s^*$, a radial velocity $V_r$, and a looking angle $\alpha$), which will typically rely on accurate knowledge of the looking angle. In some such examples, signals from a single transmitter may be relied upon to provide correct looking angle information, but such information may be of limited resolution as compared with the information possible to obtain through a combination of the signals from multiple transmitters.

In other examples, an iterative (and/or parallel) process may be employed. For example, a first target (or set of targets) can be presumed to be stationary. Based on this presumption, the egovelocity (and associated phase shifts) can be determined as described above, the return signals can be compensated accordingly (e.g., as described below regarding S133), and the resulting information can be checked for consistency (e.g., self-consistency, consistency with auxiliary information, etc.). If the information is inconsistent, then the process can be repeated with a different presumptive stationary target (or set of targets). Analogously, if information resulting from a different presumptive stationary target has greater consistency than the information from the first target, then the method can proceed relying on the superior information.

However, the set of stationary targets can additionally or alternatively be selected in any other suitable manner. Further, S132 can additionally or alternatively include determining phase shifts in any other suitable manner.

2.3.3 Refining the Analysis.

Refining the analysis S133 preferably functions to compensate the returns (e.g., based on the phase shifts determined in S132). The compensated returns can preferably be used to define a regular array of virtual receivers (e.g., substantially the same array that is defined by the system when stationary), such as shown by way of example in FIG. 8C.

S133 is preferably performed based on consolidated data (e.g., compensated returns from multiple transmitters), but can additionally or alternatively be performed based on any other suitable data. S133 preferably includes refining determination of target angles, radial velocities, and/or any other suitable information associated with the targets (e.g., for both the stationary and non-stationary targets, for only stationary targets, for only non-stationary targets, for any other suitable subset of targets, etc.). In some embodiments, S133 can include performing virtual antenna processing (e.g., as described in U.S. patent application Ser. No. 16/704,409, filed 5 Dec. 2019 and titled "Systems and Methods for Interpolated Virtual Aperture RADAR Tracking", and/or in U.S. Provisional Application 62/958,920, filed 9 Jan. 2020 and titled "Systems and Methods for Phase-Modulated Radar Detection", each of which is herein incorporated in its entirety by this reference), such as based on the consolidated data.

However, S133 can additionally or alternatively include refining the analysis in any other suitable manner.

Figure 1C:
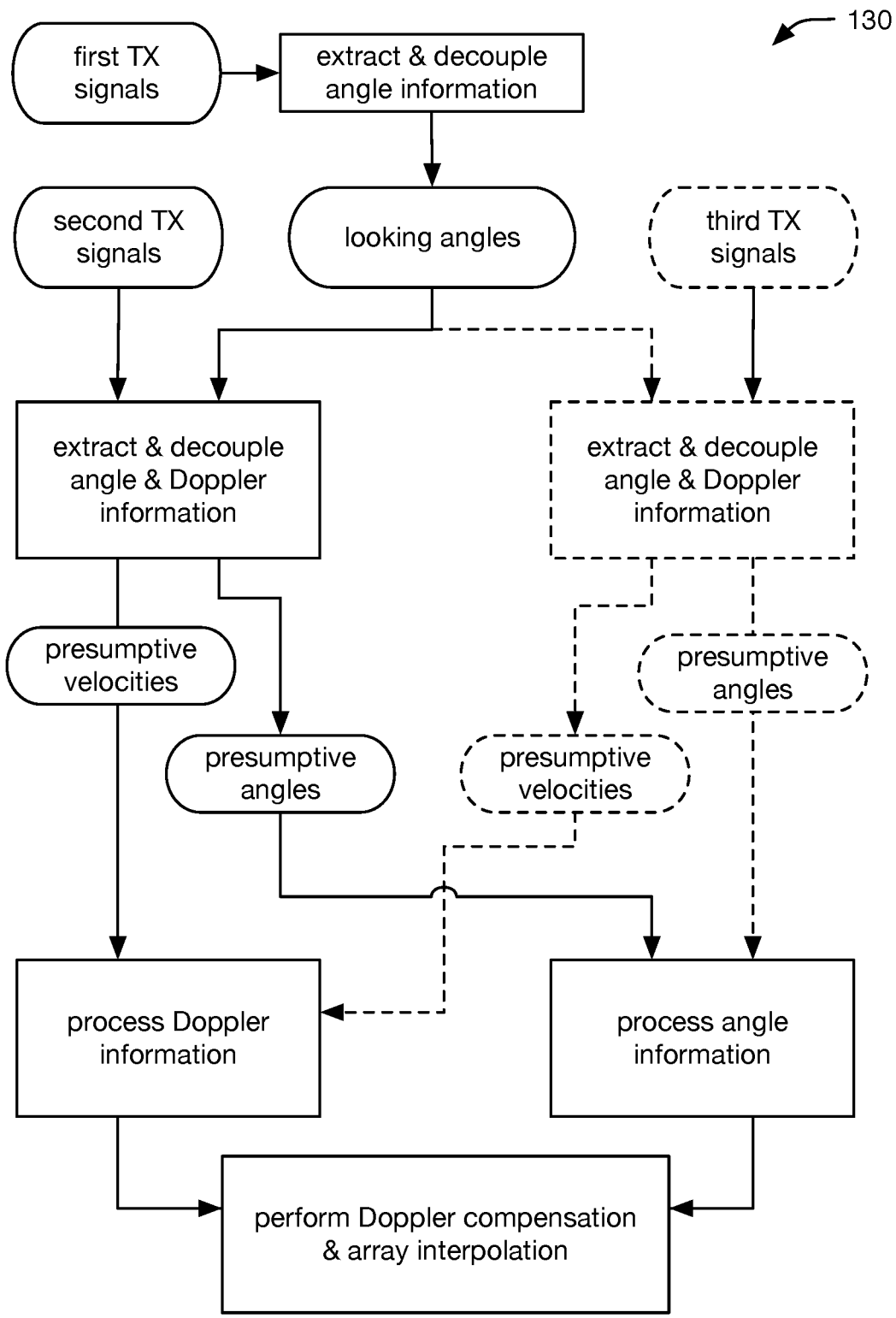
FIG. 1C is a schematic representation of an example of an element of the method.

In one example (e.g., as shown in FIG. 1C), analyzing the set of received probe signals S130 includes analyzing subsets of reflected signals, each generated by a different radar transmitter (or analogously, by a different multi-transmitter configuration). In this example, the first transmitter subset is used to extract and decouple angle information, such as to determine a looking angle (e.g., first presumptive looking angle) to each target off of which the signals reflected (or to a subset of such targets, such as a set of presumptive stationary targets known, believed, or presumed to be substantially stationary with respect to the environment). Then, for each other subset, this information is used, along with the subset, to determine angle information (e.g., presumptive looking angle to each target) and Doppler information (e.g., presumptive radial velocity of each target). For example, in a system including 3 transmitters, this information can be used with the second transmitter subset to determine a second presumptive looking angle and a first presumptive radial velocity for each target, and can independently be used with the third transmitter subset to determine a third presumptive looking angle and a second presumptive radial velocity for each target. Following this, the angle and Doppler information can be combined, reconciled, and used to compensate for phase shifts (e.g., as described above regarding S132), and the compensated information can then be used to determine information associated with an array of interpolated radar receivers (e.g., as described in U.S. patent application Ser. No. 16/704,409, filed 5 Dec. 2019 and titled "Systems and Methods for Interpolated Virtual Aperture Radar Tracking", and/or in U.S. Provisional Patent Application 62/958,920, filed 9 Jan. 2020 and titled "Systems and Methods for Phase-Modulated Radar Detection", each of which is herein incorporated in its entirety by this reference).

Figure 5C:
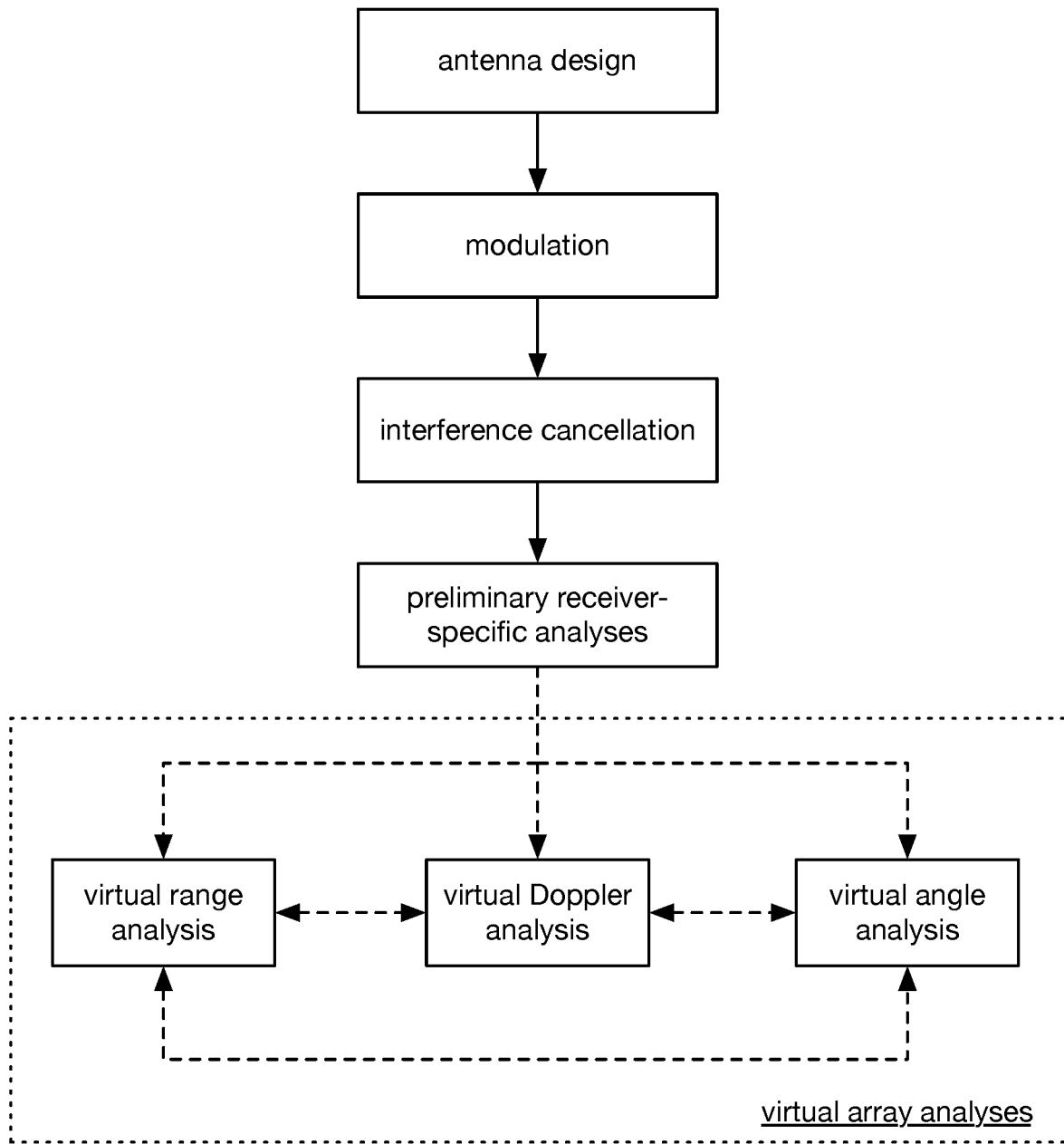
Figure 5D:
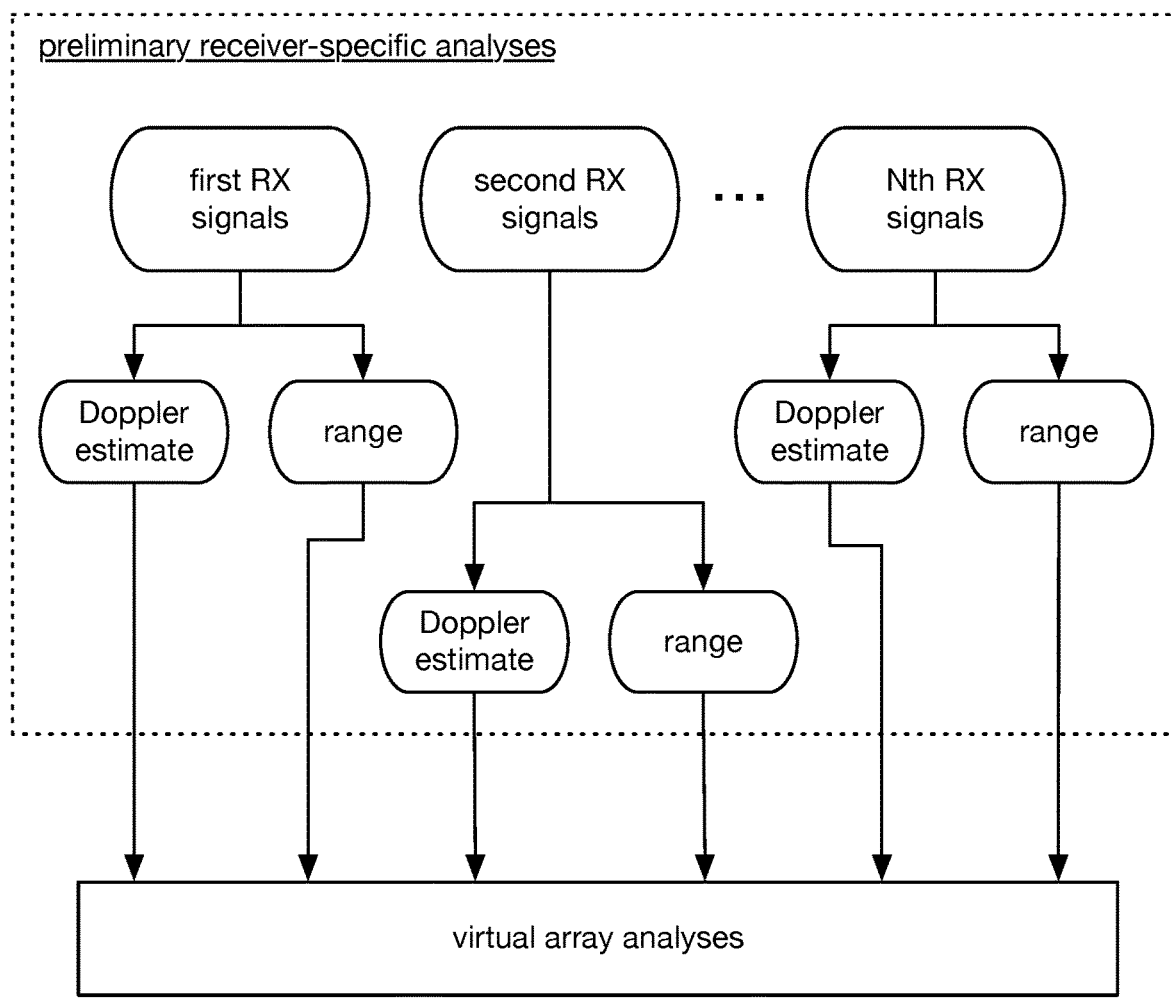
FIG. 5D is a schematic representation of a specific example of a portion of the processing flow depicted in FIG. 5C.

In some examples (e.g., as shown in FIGS. 5C-5D), in which S110 includes transmitting concurrently (or substantially concurrently) from multiple transmitters (e.g., using one or more multiplexing techniques, such as described above), S130 includes performing preliminary receiver-specific analyses (e.g., independently analyzing signals received at each receiver), preferably followed by performing virtual array analyses (e.g., performing S131, S132, and/or S133 such as described above in more detail, preferably to determine information associated with an interpolated virtual radar array). In such examples, performing preliminary receiver-specific analyses can include, for each receiver, analyzing a plurality of returns received at the receiver (e.g., returns from all transmitters from a single chirp, from a plurality of chirps such as an entire frame, etc.), determining range and Doppler information (for one or more targets, such as for all targets from which returns are received or for a subset thereof). To determine such information, the returns from different transmitters are preferably demultiplexed (e.g., decoded based on a known encoding used to achieve CDM of the transmitted signals). Here, the Doppler information may represent an estimate of radial velocity (e.g., wherein Doppler aliasing may be estimated but not known), and/or any other suitable information. In such examples, performing virtual array analyses can include determining angle information (e.g., for each target or for a subset thereof) based on the returns received at each receiver and/or based on the results of the preliminary receiver-specific analyses. Performing virtual array analyses preferably includes cross-checking the Doppler information of the different preliminary receiver-specific analyses (e.g., with each other and/or with angle information); for example, the Doppler estimates can be cross-checked (e.g., with the angle information determined in the virtual array analyses) such as described above regarding S132.

In some embodiments, the method can include one or more elements such as described in U.S. patent application Ser. No. 16/800,906, filed 25 Feb. 2020 and titled "Systems and Methods for Doppler-Enhanced Radar Tracking", which is herein incorporated in its entirety by this reference. For example, the method (e.g., S130) can include performing Doppler analysis such as described in U.S. patent application Ser. No. 16/800,906 regarding calculating initial tracking parameters S230 and/or refining the initial tracking parameters S240.

In some examples, S130 can include analyzing the received probe signals in light of information received from one or more auxiliary sensors (e.g., in light of egovelocity determined based on a vehicle speedometer, a geopositioning system receiver, an accelerometer, etc.). For example, such auxiliary sensor information can be combined with radar information using one or more approximate solution methods, such as using a particle filter, Kalman filter, and/or variant thereof (e.g., extended Kalman filter, unscented Kalman filter, hybrid Kalman filter, etc.). Alternatively, such auxiliary sensor information can be used as a primary information source (e.g., used to determine egovelocity), wherein radar information analysis is performed based on a presumption that such auxiliary sensor information is correct.

However, S130 can additionally or alternatively include analyzing the set of received probe signals in any other suitable manner. Further, the method 100 can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for radar detection, comprising:
   at a radar transmitter comprising a first transmit element and a second transmit element spatially displaced from the first transmit element, transmitting a set of radar probe signals that define a Doppler aliasing velocity, comprising:
   at a first time, at the first transmit element, transmitting a first radar probe signal of the set; and at a second time different from the first time, at the second transmit element, transmitting a second radar probe signal of the set;

at a radar receiver comprising a plurality of spatially-separated receive elements, receiving a set of sets of reflected signals, comprising:
  in response to generation of a first set of reflected signals of the set of sets via reflection of the first radar probe signal by a target, receiving the first set of reflected signals; and
  in response to generation of a second set of reflected signals of the set via reflection of the second radar probe signal by the target, receiving the second set of reflected signals;

based on the first set of reflected signals, determining a first presumptive looking angle to the target;

based on the second set of reflected signals and the first presumptive looking angle, determining a presumptive radial velocity associated with the target;

based on the presumptive radial velocity and the Doppler aliasing velocity, determining a set of possible radial velocities associated with the target;

for each possible radial velocity of the set:
  based on the possible radial velocity and a time difference between the first and second times, determining an associated phase shift;
  based on the associated phase shift, adjusting the set of sets of reflected signals;
  after adjusting the set of sets of reflected signals, based on the set of sets of reflected signals, determining a respective set of test looking angles, comprising, for each set of reflected signals of the set of sets, determining an associated test looking angle; and
  comparing the test looking angles of the respective set, comprising determining whether the test looking angles differ by less than a threshold amount;

based on the comparisons of the test looking angles of the respective sets, selecting a possible radial velocity of the set as the selected radial velocity; and based on the selected radial velocity, determining an egovelocity of at least one of the radar transmitter or the radar receiver.

2. The method of claim 1, wherein the target is substantially stationary with respect to an environment surrounding the radar transmitter and radar receiver.

3. The method of claim 2, wherein:
the first radar probe signal is reflected by a plurality of targets comprising the target, thereby generating a first plurality of sets of reflected signals, the first plurality comprising the first set of reflected signals;
the second radar probe signal is reflected by the plurality of targets, thereby generating a second plurality of sets of reflected signals, the second plurality comprising the second set of reflected signals;
the set of sets of reflected signals comprises the first and second pluralities of sets of reflected signals;
the method further comprises, based on the set of sets of reflected signals, determining that the target is substantially stationary with respect to the environment; and
selecting the selected radial velocity from the set of possible radial velocities is performed in response to determining that the target is substantially stationary with respect to the environment.

4. The method of claim 3, wherein determining that the target is substantially stationary with respect to the environment comprises:

for each target of the plurality, based on the set of sets of reflected signals, determining a respective presumptive radial velocity and a respective presumptive looking angle; and
based on the respective presumptive radial velocities and the respective presumptive looking angles, selecting, from the plurality of targets, a subset of targets for which the respective presumptive radial velocities are substantially mutually consistent, wherein the subset of targets comprises the target.

5. The method of claim 1, wherein:
receiving the first set of reflected signals comprises, at each receive element of the plurality, independently receiving a respective reflected signal of the first set of reflected signals; and
receiving the second set of reflected signals comprises, at each receive element of the plurality, independently receiving a respective reflected signal of the second set of reflected signals.

6. The method of claim 1, wherein:
transmitting the set of radar probe signals further comprises, after the first and second times:
  at a third time, at the first transmit element, transmitting a third radar probe signal of the set; and
  at a fourth time different from the third time, at the second transmit element, transmitting a fourth radar probe signal of the set; and
receiving the set of sets of reflected signals further comprises, at the radar receiver:
  in response to generation of a third set of reflected signals of the set of sets via reflection of the third radar probe signal by the target, receiving the third set of reflected signals; and
  in response to generation of a fourth set of reflected signals of the set of sets via reflection of the fourth radar probe signal by the target, receiving the fourth set of reflected signals.

7. The method of claim 6, wherein:
determining the first presumptive looking angle is performed based further on the third set of reflected signals; and
determining the presumptive radial velocity is performed based further on the fourth set of reflected signals.

8. The method of claim 7, wherein:
transmitting the first radar probe signal comprises imposing a first phase offset on the first radar probe signal;
transmitting the third radar probe signal comprises imposing a third phase offset, different from the first phase offset, on the third radar probe signal; and
determining the first presumptive looking angle comprises:
  compensating the first set of reflected signals based on the first phase offset; and
  compensating the third set of reflected signals based on the third phase offset.

9. The method of claim 6, wherein:
the first radar probe signal is transmitted for a first transmission duration;
the third radar probe signal is transmitted for a third transmission duration substantially equal to the first transmission duration;
the second time is after the first time;
the fourth time is after the third time;
a difference between the first time and the second time is equal to the sum of the first transmission duration and a first delay time; and a difference between the third time and the fourth time is equal to the sum of the third transmission duration and a third delay time substantially greater than the first delay time.

10. The method of claim 1, wherein the radar transmitter and radar receiver are mechanically coupled to a vehicle.

11. The method of claim 1, wherein:
transmitting the first radar probe signal is performed concurrently by the first, second, and third transmit elements based on a first phase encoding;
transmitting the second radar probe signal is performed concurrently by the first, second, and third transmit elements based on a second phase encoding different from the first phase encoding;
determining the first presumptive looking angle is performed based further on the first phase encoding; and
determining the presumptive radial velocity is performed based further on the second phase encoding.

12. The method of claim 11, wherein the first phase encoding is substantially orthogonal to the second phase encoding.

13. The method of claim 12, wherein:
transmitting the set of radar probe signals further comprises, after the first and second times:
at a third time, transmitting a third radar probe signal of the set concurrently at the first, second, and third transmit elements based on the first phase encoding and an additional phase offset; and
at a fourth time different from the third time, transmitting a fourth radar probe signal of the set concurrently at the first, second, and third transmit elements based on the second phase encoding and an additional phase offset; and
receiving the set of sets of reflected signals further comprises, at the radar receiver:
in response to generation of a third set of reflected signals of the set of sets via reflection of the third radar probe signal by the target, receiving the third set of reflected signals; and
in response to generation of a fourth set of reflected signals of the set of sets via reflection of the fourth radar probe signal by the target, receiving the fourth set of reflected signals.

14. The method of claim 13, wherein:
determining the first presumptive looking angle is performed based further on the third set of reflected signals and the additional phase offset; and
determining the presumptive radial velocity is performed based further on the fourth set of reflected signals and the additional phase offset.

15. The method of claim 1, wherein:
the radar transmitter further comprises a third transmit element spatially displaced form the first and second transmit elements;
transmitting the set of radar probe signals further comprises, at a third time different from the first and second times, at the third transmit element, transmitting a third radar probe signal of the set;
receiving the set of sets of reflected signals further comprises, at the radar receiver, in response to generation of a third set of reflected signals of the set of sets via reflection of the third radar probe signal by the target, receiving the third set of reflected signals;
the method further comprises, based on the third set of reflected signals and the first presumptive looking angle, determining a second presumptive radial velocity;

the set of possible radial velocities is determined based further on the second presumptive radial velocity; and
for each possible radial velocity of the set, the method further comprises:
based on the possible radial velocity and a second time difference between the first and third times, determining a second associated phase shift; and
adjusting the set of sets of reflected signals is performed based further on the second associated phase shift.

16. The method of claim 15, wherein, for each possible radial velocity of the set, adjusting the set of sets of reflected signals comprises:
compensating the second set of reflected signals based on the associated phase shift; and
compensating the third set of reflected signals based on the second associated phase shift.

17. The method of claim 15, wherein:
transmitting the set of radar probe signals further comprises, after the first and second times:
at a third time, at the first transmit element, transmitting a third radar probe signal of the set; and
at a fourth time different from the third time, at the second transmit element, transmitting a fourth radar probe signal of the set; and
receiving the set of sets of reflected signals further comprises, at the radar receiver:
in response to generation of a third set of reflected signals of the set of sets via reflection of the third radar probe signal by the target, receiving the third set of reflected signals; and
in response to generation of a fourth set of reflected signals of the set of sets via reflection of the fourth radar probe signal by the target, receiving the fourth set of reflected signals.

18. The method of claim 17, wherein:
determining the first presumptive looking angle is performed based further on the third set of reflected signals; and
determining the presumptive radial velocity is performed based further on the fourth set of reflected signals.

19. The method of claim 15, wherein:
receiving the first set of reflected signals comprises, at each receive element of the array, independently receiving a respective reflected signal of the first set of reflected signals; and
receiving the second set of reflected signals comprises, at each receive element of the array, independently receiving a respective reflected signal of the second set of reflected signals.

20. The method of claim 19, wherein:
the set of radar probe signals define a radar wavelength;
the array of receive elements comprises a first receive element, a second receive element, and a third receive element;
the first receive element and the second receive element are separated by a first distance, wherein the first distance is substantially equal to half the radar wavelength; and
a third receive element of the array is arranged substantially farther than the first distance from every other receive element of the array.

21. The method of claim 20, wherein:
the radar transmitter defines an array of transmit elements, the array comprising the first, second, and third transmit elements;

the first transmit element and the second transmit element are separated by a distance substantially equal to the first distance; and the third transmit element is arranged substantially farther than the first distance from every other transmit element of the array.

22. The method of claim 1, wherein each possible radial velocity of the set is substantially equal to a sum of the presumptive radial velocity and a respective integer multiple of the Doppler aliasing velocity.

* * * * *